United States Patent
Odaka

(10) Patent No.: US 11,067,173 B2
(45) Date of Patent: Jul. 20, 2021

(54) PISTON ASSEMBLY AND FLUID PRESSURE DEVICE

(71) Applicant: SMC CORPORATION, Chiyoda-ku (JP)

(72) Inventor: Tsukasa Odaka, Tsukubamirai (JP)

(73) Assignee: SMC CORPORATION, Chiyoda-ku (JP)

(*) Notice: Subject to any disclaimer, the term of this patent is extended or adjusted under 35 U.S.C. 154(b) by 0 days.

(21) Appl. No.: 16/466,522

(22) PCT Filed: Nov. 13, 2017

(86) PCT No.: PCT/JP2017/040679
§ 371 (c)(1),
(2) Date: Jun. 4, 2019

(87) PCT Pub. No.: WO2018/105314
PCT Pub. Date: Jun. 14, 2018

(65) Prior Publication Data
US 2020/0063865 A1 Feb. 27, 2020

(30) Foreign Application Priority Data

Dec. 6, 2016 (JP) .............................. JP2016-236402
Feb. 15, 2017 (JP) .............................. JP2017-025576

(51) Int. Cl.
F16J 1/12 (2006.01)
F15B 15/14 (2006.01)
(Continued)

(52) U.S. Cl.
CPC ............. F16J 1/12 (2013.01); F15B 15/1447 (2013.01); F15B 15/226 (2013.01); F16J 1/008 (2013.01); Y10T 403/61 (2015.01)

(58) Field of Classification Search
CPC ......... F16J 7/00; F16J 1/12; F16J 1/24; F04B 53/147; F15B 15/1447
(Continued)

(56) References Cited

U.S. PATENT DOCUMENTS 3,391,612 A * 7/1968 Franzsneen ........... F15B 15/125
92/128
4,898,083 A * 2/1990 Jones ......................... F16J 1/12
92/255
(Continued)

FOREIGN PATENT DOCUMENTS

CN 101506533 A 8/2009
CN 106051279 A 10/2016
(Continued)

OTHER PUBLICATIONS

Combined Chinese Office Action and Search Report dated Feb. 3, 2020, in Patent Application No. 201780075451.3, 19 pages (with English translation and English Translation of Category of Cited Documents).
(Continued)

Primary Examiner — Thomas E Lazo
Assistant Examiner — Michael Quandt
(74) Attorney, Agent, or Firm — Oblon, McClelland, Maier & Neustadt, L.L.P.

(57) ABSTRACT

A rod assembly for a fluid pressure cylinder includes a rod member and a packing that is mounted on an outer circumferential part of the rod member and slides along a slide hole. Assembly is simple because a conventional hard piston is not used. The assembly can be carried out simply by hand without the use of a dedicated tool. Thus, the rod assembly simplifies assembly work.

10 Claims, 16 Drawing Sheets

(51) Int. Cl.
   *F15B 15/22*   (2006.01)
   *F16J 1/00*   (2006.01)
(58) Field of Classification Search
   USPC .......................................... 92/128, 258, 173
   See application file for complete search history.

(56) References Cited

U.S. PATENT DOCUMENTS

| | | | |
|---|---|---|---|
| 8,302,526 | B2 | 11/2012 | Fukui et al. |
| 2002/0027051 | A1 | 3/2002 | Grundei |
| 2006/0162549 | A1* | 7/2006 | Wang .................... F16J 1/12 92/129 |
| 2007/0138721 | A1* | 6/2007 | Handke .................. F16F 9/585 267/219 |
| 2014/0157981 | A1 | 6/2014 | Saito et al. |

FOREIGN PATENT DOCUMENTS

| | | |
|---|---|---|
| DE | 9416082 U1 | 12/1994 |
| DE | 10 2008 045 658 A1 | 3/2010 |
| JP | 49-1754 U | 1/1974 |
| JP | 51-47994 | 11/1976 |
| JP | 57-164301 U | 10/1982 |
| JP | 3-43139 U | 4/1991 |
| JP | 5-346106 A | 12/1993 |
| JP | 10-299718 A | 11/1998 |
| JP | 3104267 B2 | 10/2000 |
| JP | 2014-114874 A | 6/2014 |
| KR | 10-2012-0045043 A | 5/2012 |
| KR | 10-2014-0034198 A | 3/2014 |

OTHER PUBLICATIONS

International Search Report dated Jan 16, 2018 in PCT/JP2017/040679 filed Nov. 13, 2017.
Office Action dated Jul. 16, 2020 in Corresponding Korean Patent Application No. 10-2019-7019427 (with English Translation), pages.
Extended European Search Report dated Aug. 24, 2020 in corresponding European Patent Application No. 17878719.8, 10 pages.
Office Action dated Apr. 20, 2021 in India Patent Application No. 201947026969; 6pgs.

* cited by examiner

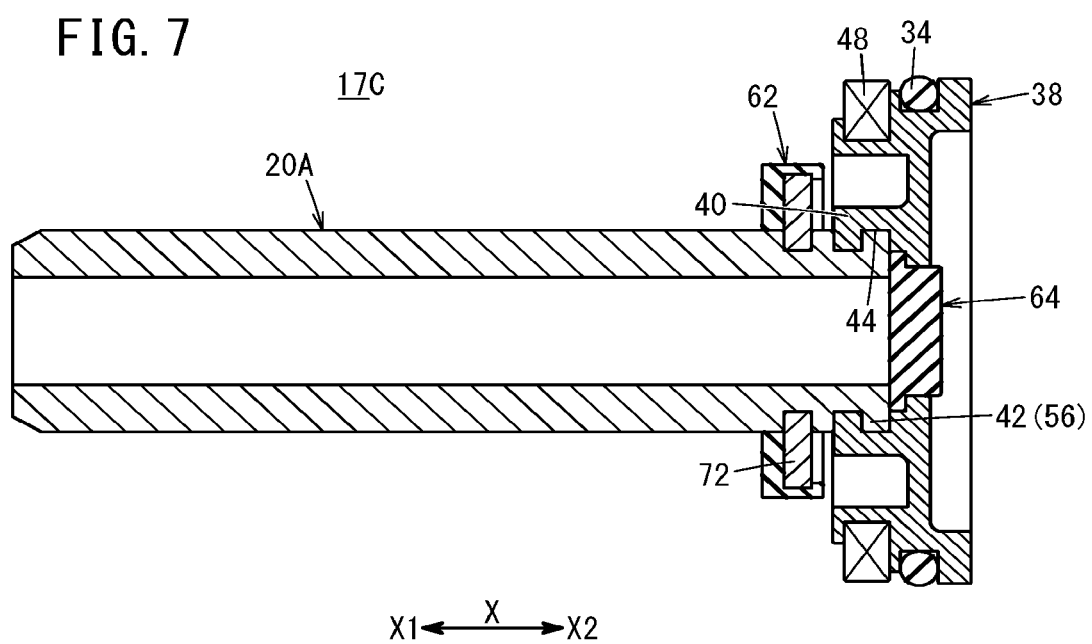

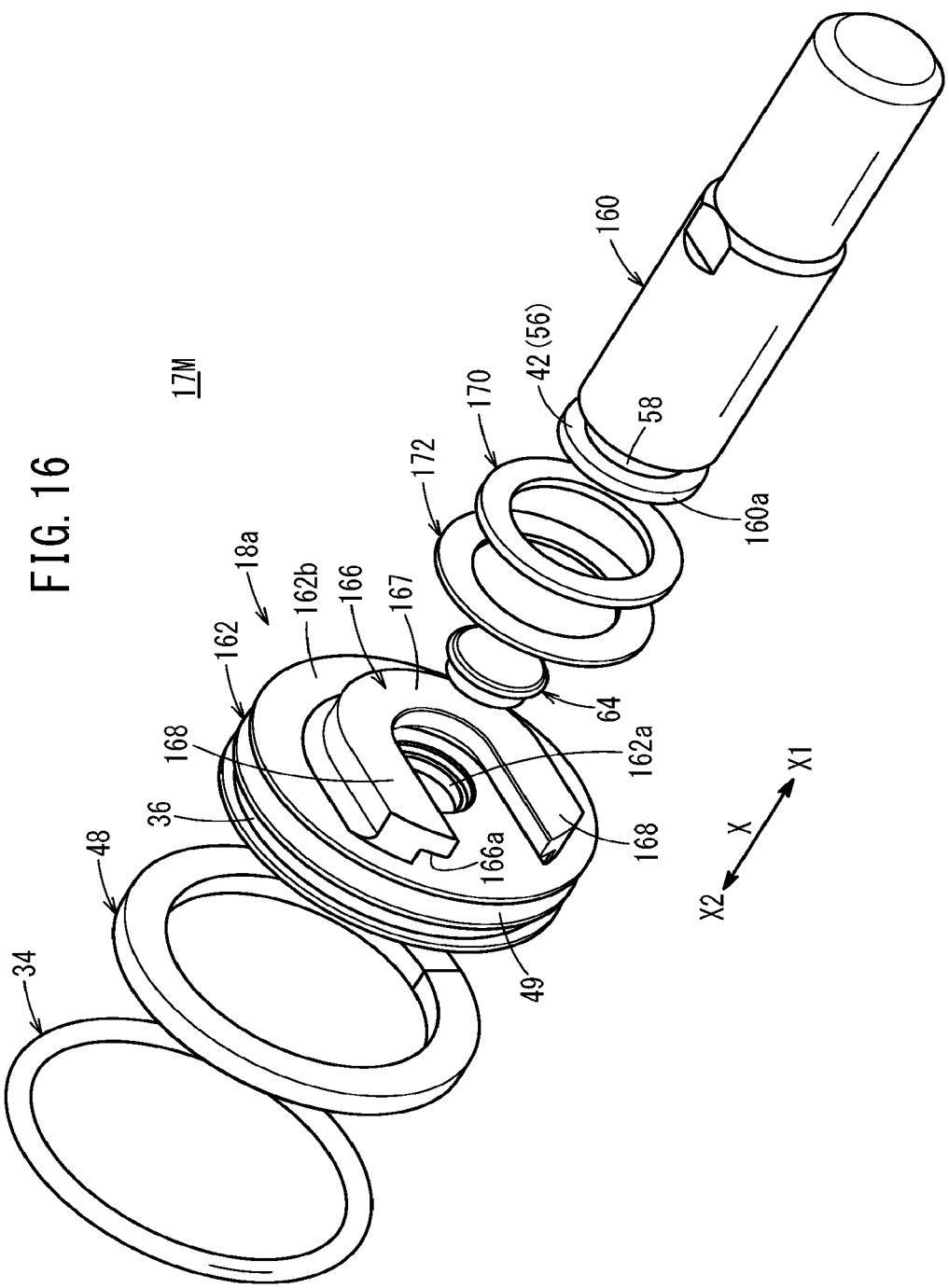

PISTON ASSEMBLY AND FLUID PRESSURE DEVICE

TECHNICAL FIELD

The present invention relates to piston assemblies reciprocating along sliding holes and to fluid pressure devices.

BACKGROUND ART

Various devices are known as fluid pressure devices provided with pistons. For example, fluid pressure cylinders including pistons displaced by the effect of supplied pressurized fluid are well known as means (actuators) for carrying workpieces and the like. A typical fluid pressure cylinder includes a cylinder tube, a piston disposed inside the cylinder tube to be movable in the axial direction, and a piston rod connected with the piston (for example, see Japanese Laid-Open Patent Publication No. 2014-114874). In such a fluid pressure cylinder, when pressurized fluid such as air is supplied into the cylinder tube, the piston is pushed by the pressurized fluid and displaced in the axial direction. This also causes the piston rod connected with the piston to be displaced in the axial direction.

SUMMARY OF INVENTION

A piston and a piston rod in a typical fluid pressure device are assembled by, for example, inserting one end portion of the piston rod into a hole formed in the central part of the piston and caulking (plastically deforming) the one end portion. The assembly requires specific tools or devices and thus is complicated.

The present invention has been devised taking into consideration the aforementioned problems, and has the object of providing a piston assembly and a fluid pressure device capable of being assembled through a simplified process.

To achieve above-described object, a piston assembly according to the present invention comprises a piston body displaceable in an axial direction inside a sliding hole and a piston rod protruding from the piston body in the axial direction, wherein the piston body includes a piston-side engaging portion, the piston rod includes a rod-side engaging portion engaging with the piston-side engaging portion, and one of the piston-side engaging portion and the rod-side engaging portion is inserted into the other from a side to engage with each other to regulate relative axial displacement between the piston body and the piston rod.

One of the piston-side engaging portion and the rod-side engaging portion may include an engaging groove having a U shape, a C shape, or a semicircular arc shape, and the other of the piston-side engaging portion and the rod-side engaging portion may include an engaging protrusion having an annular shape and fitted in the engaging groove.

The engaging groove may be provided for the piston-side engaging portion, and the engaging protrusion may be provided for the rod-side engaging portion.

The piston-side engaging portion and the rod-side engaging portion may engage with each other to be rotatable relative to each other about an axis of the piston body.

The piston assembly may further comprise a damper mechanism configured to relieve impact occurring when the piston body reaches at least one of stroke ends. The damper mechanism may be supported by the piston body so as not to transmit impact load to the piston body when the piston body reaches the stroke end.

The damper mechanism may include a circumference-side damper disposed in an outer circumferential part of the piston rod. The piston rod may be provided with a stopper receiving groove extending in a circumferential direction in the outer circumferential part. A stopper member divided into a plurality of elements in the circumferential direction may be fitted in the stopper receiving groove. The circumference-side damper may cover the stopper member, and thus the stopper member may support the circumference-side damper and may be prevented from coming off the stopper receiving groove.

The damper mechanism may include an end-side damper disposed at an end surface of the piston rod. The end-side damper may be held between the piston body and the piston rod and may protrude from a through-hole disposed in a central part of the piston body.

The end-side damper may seal a gap between the piston body and the piston rod.

The end-side damper may elastically push the end surface of the piston rod.

This structure can eliminate or reduce wobbling between the piston body and the piston rod.

The piston body may be composed of resin.

The piston body may be provided with a thin portion having a depth in an axial direction of the piston body and surrounding the piston-side engaging portion.

The piston-side engaging portion may protrude from an end surface of the piston body in the axial direction and may have a U shape when viewed in the axial direction. The piston-side engaging portion may be provided with a U-shaped engaging groove in an inner circumferential surface. The rod-side engaging portion may include an engaging protrusion having an annular shape and fitted in the U-shaped engaging groove.

The piston assembly may further comprise a circumference-side damper having a ring shape and disposed around an outer circumferential part of the piston rod to relieve impact occurring when the piston body reaches a stroke end and a spacer having a ring shape and interposed between the piston body and the circumference-side damper. The piston body, the spacer, and the circumference-side damper may be stacked in the axial direction.

Moreover, a fluid pressure device according to the present invention comprises a body having a sliding hole inside the body and a piston assembly disposed to be able to reciprocate along the sliding hole, wherein the piston assembly includes a piston body displaceable in an axial direction inside the sliding hole and a piston rod protruding from the piston body in the axial direction, the piston body includes a piston-side engaging portion, the piston rod includes a rod-side engaging portion engaging with the piston-side engaging portion, and one of the piston-side engaging portion and the rod-side engaging portion is inserted into the other from a side to engage with each other to regulate relative axial displacement between the piston body and the piston rod.

The fluid pressure device may be configured as a fluid pressure cylinder, a valve device, a measuring cylinder, a sliding table, or a chuck device.

According to the piston assembly and the fluid pressure device of the present invention, the piston body and the piston rod can be easily connected by displacing the piston-side engaging portion and the rod-side engaging portion in a direction perpendicular to the axis of the piston body to engage with each other during the assembly process of connecting the piston body and the piston rod. Moreover, the assembly can be easily performed by hand without using any specific tools, facilities, or devices. Consequently, the piston assembly of the present invention can simplify the assembly work.

The above-described object, features, and advantages will become more apparent from the following description of preferred embodiments in conjunction with the accompanying drawings.

BRIEF DESCRIPTION OF DRAWINGS

FIG. 7 is a cross-sectional view of a piston assembly according to a third embodiment;

FIG. 16 is a perspective view of the piston assembly illustrated in FIG. 15 viewed from a side on which a piston rod lies.

DESCRIPTION OF EMBODIMENTS

Preferred embodiments of a piston assembly and a fluid pressure device according to the present invention will be described in detail below with reference to the accompanying drawings.

Figure 1:
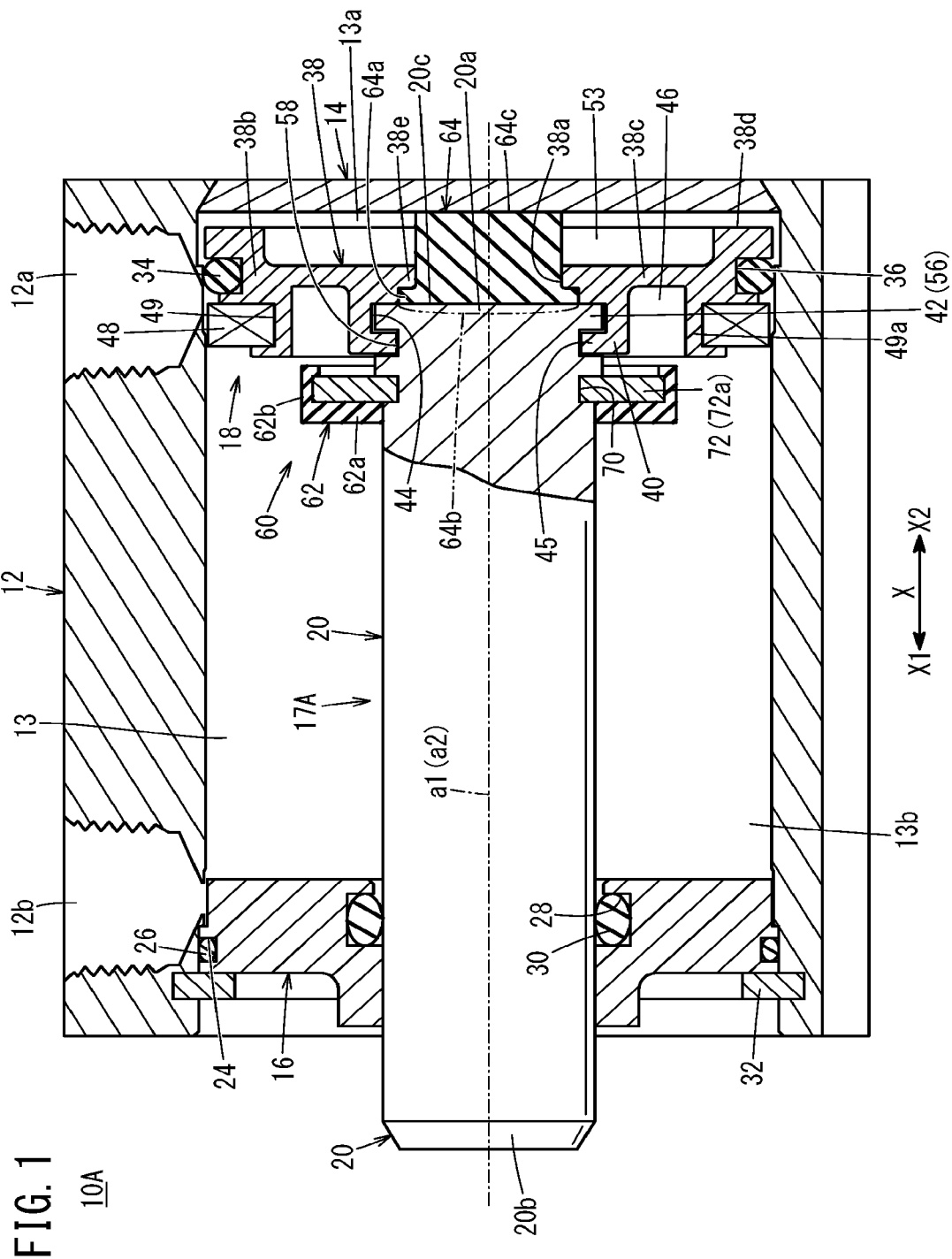
FIG. 1 is a cross-sectional view of a fluid pressure cylinder provided with a piston assembly according to a first embodiment.

A fluid pressure cylinder 10A, illustrated in FIG. 1 as an example of a fluid pressure device is provided with a cylinder tube 12 (body) having a hollow cylindrical shape, a head cover 14 disposed at one end portion of the cylinder tube 12, a rod cover 16 disposed at another end portion of the cylinder tube 12, and a piston assembly 17A disposed to be able to reciprocate in the axial direction of the cylinder tube 12.

The piston assembly 17A includes a piston unit 18 disposed inside the cylinder tube 12 to be movable in the axial direction (direction of an arrow X) and a piston rod 20 connected with the piston unit 18. The fluid pressure cylinder 10A is used as an actuator for, for example, carrying a workpiece.

The cylinder tube 12 is a tube-like structure composed of, for example, metal materials such as aluminum alloy extending in the axial direction. In this embodiment, the cylinder tube 12 has a hollow cylindrical shape. The cylinder tube 12 has a first port 12a disposed on one end side in the axial direction (end toward the direction of an arrow X2), a second port 12b disposed on another end side in the axial direction (end toward in the direction of an arrow X1), and a sliding hole 13 (cylinder chamber) communicating with the first port 12a and the second port 12b.

The head cover 14 is a plate-like structure composed of, for example, metal material similar to the material of the cylinder tube 12 and is disposed to cover the one end portion (end portion located in the direction of the arrow X2) of the cylinder tube 12. The head cover 14 hermetically closes the one end portion of the cylinder tube 12.

The rod cover 16 is a circular ring-shaped member composed of, for example, metal materials similar to the materials of the cylinder tube 12 and is disposed to cover the other end portion (end portion toward the direction of the arrow X1) of the cylinder tube 12. An outer annular groove 24 is formed in an outer circumferential part of the rod cover 16. An outer sealing member 26 composed of elastic materials is fitted in the outer annular groove 24 to seal a gap between the outer circumferential surface of the rod cover 16 and the inner circumferential surface of the sliding hole 13.

An inner annular groove 28 is formed in an inner circumferential part of the rod cover 16. An inner sealing member 30 composed of elastic materials is fitted in the inner annular groove 28 to seal a gap between the inner circumferential surface of the rod cover 16 and the outer circumferential surface of the piston rod 20. The rod cover 16 is fastened by a stopper 32 secured to an inner circumferential part of the cylinder tube 12 on the other end side of the cylinder tube 12.

The piston unit 18 is accommodated inside the cylinder tube 12 (sliding hole 13) to be slidable in the axial direction and partitions the sliding hole 13 into a first pressure chamber 13a which is on the first port 12a side and a second pressure chamber 13b which is on the second port 12b side. In this embodiment, the piston unit 18 is connected with one end portion 20a (hereinafter referred to as "proximal end portion 20a") of the piston rod 20.

As illustrated in FIG. 1, the piston unit 18 includes a piston body 38 connected with the piston rod 20 and a packing 34 and a magnet 48 attached to the piston body 38.

The piston body 38 is an annular member protruding radially outward from the proximal end portion 20a of the piston rod 20. The outer diameter of the piston body 38 is larger than the outer diameter of the piston rod 20. A through-hole 38a passes through a central part of the piston body 38 in the axial direction. The piston body 38 is provided with an annular packing receiving groove 36 and an annular magnet receiving groove 49 in an outer circumferential part (hereinafter referred to as "piston outer circumferential portion 38b") with a space between the grooves in the axial direction.

Figure 3:
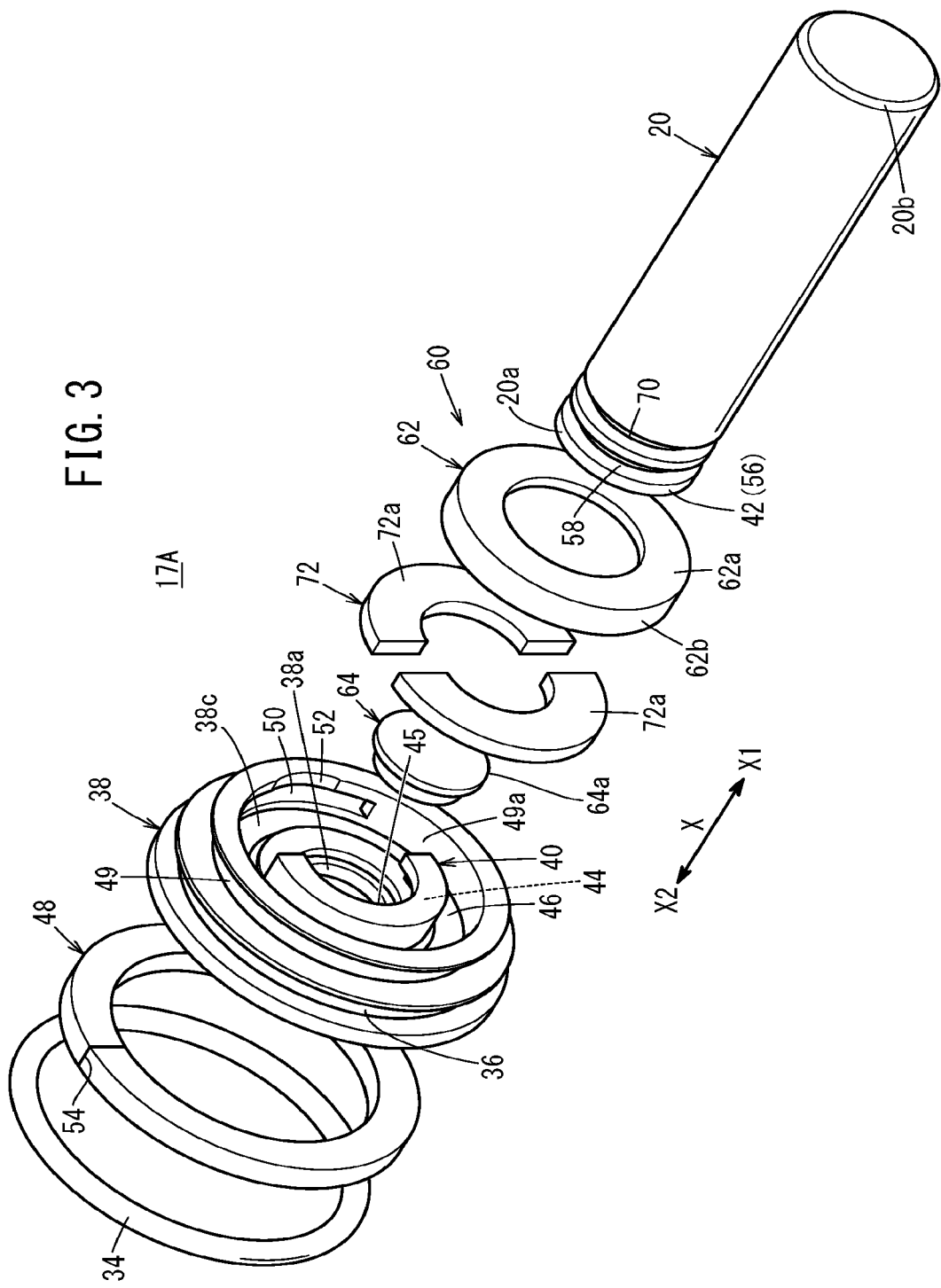
FIG. 3 is a perspective view of the piston assembly viewed from a side on which a piston rod lies.

The piston body 38 is provided with a piston-side engaging portion 40 engaging with a rod-side engaging portion 42 of the piston rod 20 (described below). The piston-side engaging portion 40 has a shape that is open sideways. In FIG. 3, the piston-side engaging portion 40 extends in a semicircular arc partially surrounding the through-hole 38a and protrudes in the axial direction from a disk-shaped wall portion 38c surrounding the through-hole 38a.

As illustrated in FIG. 1, the piston-side engaging portion 40 is provided with an engaging groove 44 in an inner circumferential part. The engaging groove 44 extends in a semicircular arc as does the piston-side engaging portion 40. An inner protrusion 45 protruding inward is disposed adjacent to the engaging groove 44. The piston-side engaging portion 40 (engaging groove 44) may have a C shape or a U shape instead of the semicircular arc shape.

The piston body 38 is provided with a thin portion 46 having a depth in the axial direction of the piston body 38 and surrounding the piston-side engaging portion 40. In FIGS. 1 and 3, the thin portion 46 has a ring shape open toward the rod cover 16 and disposed between the piston-side engaging portion 40 and the magnet receiving groove 49. A plurality of holes disposed at intervals in the circumferential direction may constitute the thin portion 46. The thin portion 46 may be omitted.

In FIG. 3, a surrounding wall 49a defining the bottom of the magnet receiving groove 49 is provided with an opening 50 extending in the circumferential direction. The opening 50 is disposed at a position facing the side opening of the piston-side engaging portion 40, and passes through the surrounding wall 49a in the thickness direction. The surrounding wall 49a is provided with a cutout portion 52 communicating with the opening 50. The cutout portion 52 has an arc shape formed by partially cutting off an inner circumferential part of the surrounding wall 49a. As described below in detail, the opening 50 and the cutout portion 52 are used when the piston rod 20 is assembled into the piston body 38.

Figure 2:
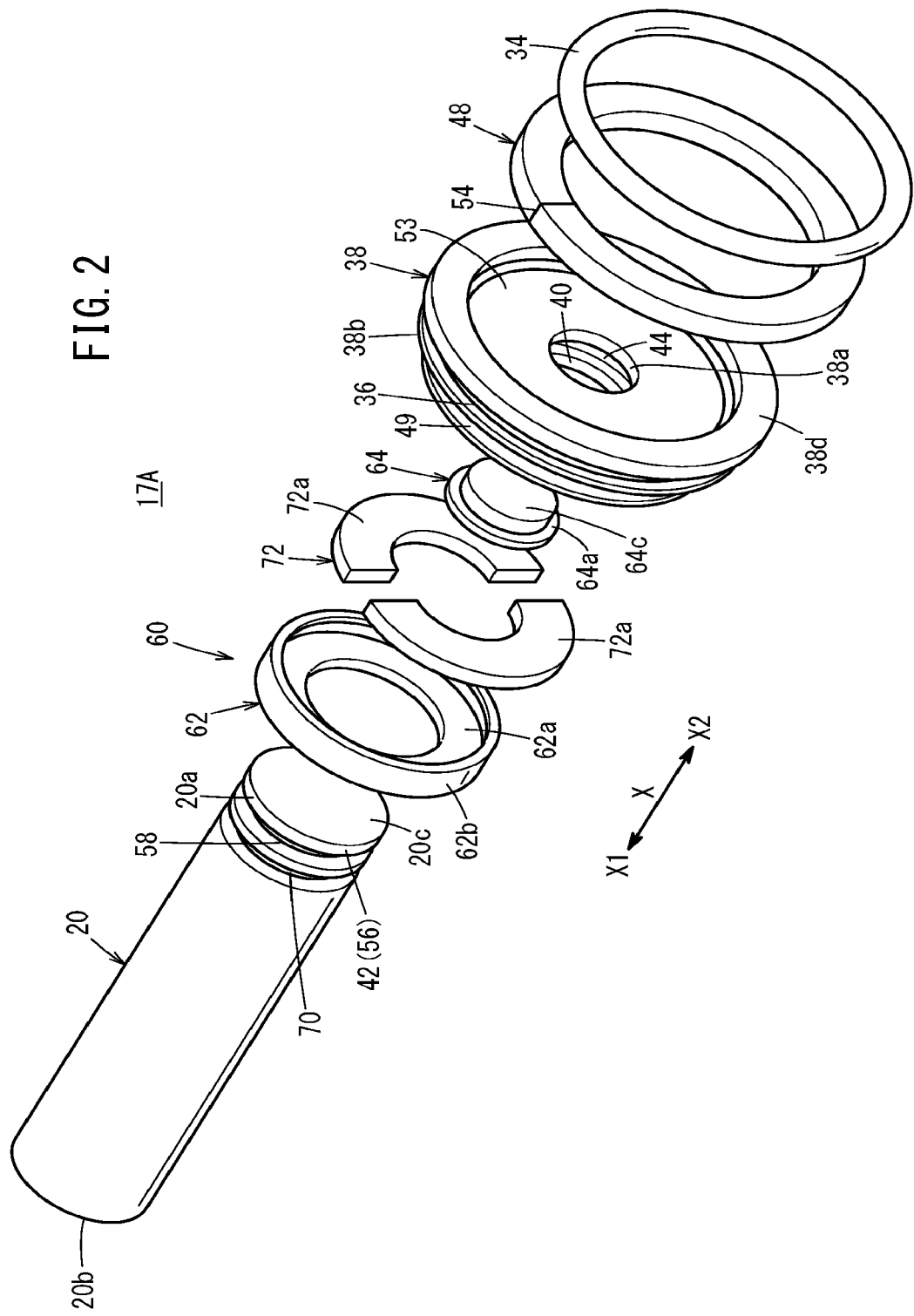
FIG. 2 is a perspective view of the piston assembly viewed from a side on which a piston body lies.

In FIGS. 1 and 2, a surface 38d on the head cover 14 side of the piston body 38 is provided with a thin portion 53 depressed toward the piston rod 20. The thin portion 53 has an annular shape and is disposed between the packing receiving groove 36 and the through-hole 38a. A plurality of holes disposed at intervals in the circumferential direction may constitute the thin portion 53. The thin portion 53 may be omitted.

The piston body 38 is composed of hard resin. For example, the piston body 38 composed of resin can be produced by injection molding. The piston body 38 may be composed of, for example, metal materials such as carbon steel, stainless steel, and aluminum alloy instead of resin.

The packing 34 is a ring-shaped sealing member (for example, O-ring) composed of an elastic body attached to the piston outer circumferential portion 38b (packing receiving groove 36). The constituent material of the packing 34 includes an elastic material such as rubber and elastomer. The packing 34 touches the inner circumferential surface of the sliding hole 13 and the piston outer circumferential portion 38b (packing receiving groove 36) with no gap left along the entire circumference of the packing 34 in an airtight or liquid-tight manner. The packing 34 seals a gap between the outer circumferential surface of the piston unit 18 and the inner circumferential surface of the sliding hole 13 and separates in an airtight or liquid-tight manner the first pressure chamber 13a and the second pressure chamber 13b from each other inside the sliding hole 13.

The magnet 48 is a circular ring-shaped member attached to the piston outer circumferential portion 38b (magnet receiving groove 49). The magnet 48 is elastically deformable. The magnet 48 is a plastic magnet having a slit 54 (gap) partially in the circumferential direction. Thus, the magnet 48 elastically deforms when being fitted in the magnet receiving groove 49, enabling an easy fitting.

Magnetic sensors (not illustrated) are attached to the outer surface of the cylinder tube 12 at positions corresponding to both stroke ends of the piston unit 18. The magnetic sensors detect magnetism generated by the magnet 48 to detect the working position of the piston unit 18.

The piston rod 20 is a pillar-shaped (cylindrical) member extending in the axial direction of the sliding hole 13. The piston body 38 is connected with the proximal end portion 20a of the piston rod 20. The proximal end portion 20a of the piston rod 20 is provided with the rod-side engaging portion 42 engaging with the piston-side engaging portion 40. One of the piston-side engaging portion 40 and the rod-side engaging portion 42 is inserted into the other from a side direction to engage with each other, whereby the relative axial displacement between the piston body 38 and the piston rod 20 is regulated.

The rod-side engaging portion 42 has a T shape in a cross-section along the axial direction of the piston rod 20. Specifically, the rod-side engaging portion 42 has an annular engaging protrusion 56 fitted in the engaging groove 44. The engaging protrusion 56 extends in a circle in the circumferential direction. The piston rod 20 is provided with an annular groove 58 formed in an outer circumferential part adjacent to the engaging protrusion 56 and extending in a circle in the circumferential direction.

When the piston assembly 17A is in the assembled state illustrated in FIG. 1, the engaging protrusion 56 of the rod-side engaging portion 42 is fitted in the engaging groove 44 of the piston-side engaging portion 40, and the inner protrusion 45 of the piston-side engaging portion 40 is fitted in the annular groove 58 of the rod-side engaging portion 42. Thus, the piston body 38 and the piston rod 20 are connected while being prevented from moving relative to each other in the axial direction. Thus, the thrust of the piston body 38 by the fluid pressure is successfully transmitted to the piston rod 20.

The structures of the piston-side engaging portion 40 and the rod-side engaging portion 42 may be switched. That is, the piston-side engaging portion 40 may have the structure including the engaging protrusion 56, and the rod-side engaging portion 42 may have the structure including the engaging groove 44.

The piston-side engaging portion 40 and the rod-side engaging portion 42 engage with each other to be rotatable relative to each other about an axis a1 of the piston body 38. Thus, the piston body 38 and the piston rod 20 are rotatable relative to each other about the axis a1 of the piston body 38.

The piston rod 20 passes through the rod cover 16. A distal end portion 20b which is the opposite end portion of the proximal end portion 20a of the piston rod 20 is exposed to the outside of the sliding hole 13. The constituent material of the piston rod 20 includes, for example, metal materials such as carbon steel, stainless steel, and aluminum alloy and hard resin.

The piston assembly 17A is provided with a damper mechanism 60 relieving impact occurring when the piston body reaches the stroke ends. In FIGS. 1 to 3, the damper mechanism 60 includes a circumference-side damper 62 disposed around an outer circumferential part of the piston rod 20 and an end-side damper 64 disposed at an end surface of the piston rod 20. The circumference-side damper 62 and the end-side damper 64 are composed of, for example, elastic materials such as rubber and elastomer (urethane rubber or the like).

The circumference-side damper 62 relieves impact occurring when the piston body reaches the stroke end on the rod cover 16 side. The circumference-side damper 62 is disposed in the vicinity of the piston body 38 and is closer to the rod cover 16 than the piston body 38 is. The circumference-side damper 62 has a circular ring shape and is disposed to surround the piston rod 20.

The piston rod 20 is provided with an annular stopper receiving groove 70 in an outer circumferential part of the piston rod 20 in the vicinity of the piston body 38. An annular stopper member 72 is fitted in the stopper receiving groove 70. The stopper member 72 is constituted by a plurality of stopper elements 72a divided in the circumferential direction. Each of the stopper elements 72a is arc-shaped.

In FIGS. 2 and 3, the stopper member 72 is divided into halves and constituted by the two stopper elements 72a of semicircular arcs. The inner circumference of the stopper member 72 (inner circumferences of the stopper elements 72a) is fitted in the stopper receiving groove 70. The stopper member 72 is composed of hard materials, for example, materials similar to the above-described materials of the piston rod 20.

The circumference-side damper 62 is attached to the stopper member 72 and covers the stopper member 72. Specifically, the circumference-side damper 62 includes a damper body portion 62a covering a rod cover 16 side (side located in the direction of the arrow X1) of the stopper member 72 and a circumference covering portion 62b covering the outer circumference of the stopper member 72. The circumference covering portion 62b is attached to the outer circumference of the stopper member 72. Thus, the circumference-side damper 62 is supported by the stopper member 72. Moreover, since the circumference-side damper 62 is attached to the stopper member 72, the stopper member 72 is prevented from coming off the stopper receiving groove 70.

The end-side damper 64 relieves impact occurring when the piston body reaches the stroke end of the head cover 14 side. The end-side damper 64 is held between the piston body 38 and the piston rod 20 and protrudes from the through-hole 38a disposed in the central part of the piston body 38. In FIG. 1, the end-side damper 64 protrudes further toward the head cover 14 (in the direction of the arrow X2) than the surface 38d of the head cover 14 side of the piston body 38.

The protruding end surface of the end-side damper 64 may be located closer to the rod cover 16 than the end surface of the head cover 14 side of the piston body 38 is. In this case, the head cover 14 is provided with a protrusion protruding toward the piston assembly 17A.

In FIGS. 2 and 3, the end-side damper 64 has a cylindrical shape (or a disk shape). Specifically, the end-side damper 64 is provided with an annular brim-shaped portion 64a protruding radially outward at an end of the piston rod 20 side of the end-side damper 64. In FIG. 1, the brim-shaped portion 64a is held between a stepped portion 38e (reduced diameter portion) formed in an inner circumferential part of the piston body 38 and an end surface 20c of the piston rod 20.

In FIG. 1, the end-side damper 64 touches the inner circumferential part of the piston body 38 and the end surface 20c of the piston rod 20 with no space left and thereby seals a gap between the piston body 38 and the piston rod 20 in an airtight or liquid-tight manner.

The end of the end-side damper 64 on a side where the brim-shaped portion 64a is provided includes an expanding portion 64b (indicated by a virtual line in FIG. 1) expanding in the axial direction in a state before assembly (state before being held between the piston rod 20 and the piston body 38). Thus, the end-side damper 64 elastically pushes the end surface 20c of the piston rod 20 in an assembled state (state where the end-side damper 64 is held between the piston rod 20 and the piston body 38). This eliminates or reduces wobbling between the piston rod 20 and the piston body 38.

The fluid pressure cylinder 10A may include only one of the circumference-side damper 62 and the end-side damper 64 or may include none of the circumference-side damper 62 and the end-side damper 64.

Next, an example method of assembling the piston assembly 17A configured as above will be described.

Figure 4A:
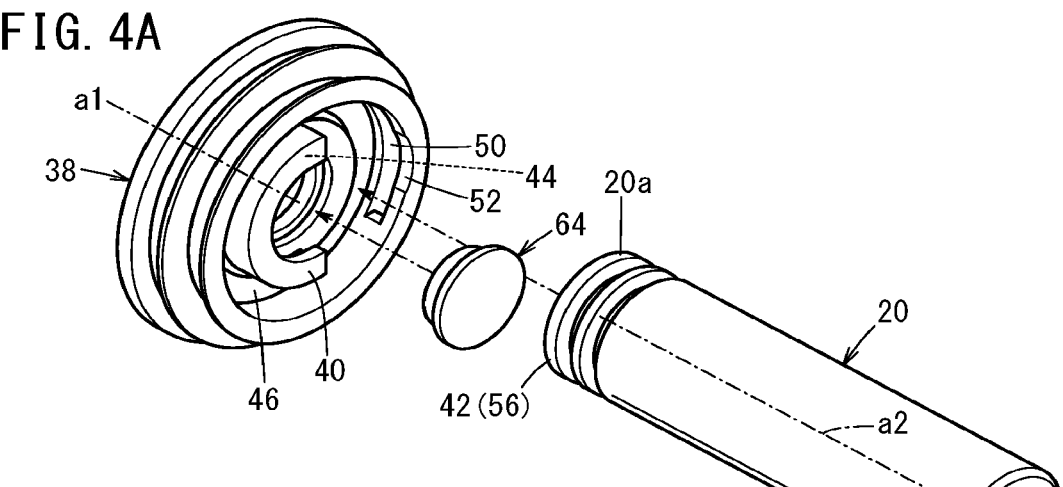
FIG. 4A is a first diagram illustrating a method of assembling the piston assembly.

First, as illustrated in FIG. 4A, the piston body 38, the piston rod 20, and the end-side damper 64 are prepared. Next, the end-side damper 64 is inserted into the through-hole 38a of the piston body 38 from a side on which the piston-side engaging portion 40 lies. Then, the piston body 38 and the piston rod 20 are displaced relative to each other in the axial direction to insert the proximal end portion 20a (rod-side engaging portion 42) of the piston rod 20 into a space between the piston-side engaging portion 40 and the piston outer circumferential portion 38b (thin portion 46) as illustrated in FIG. 4B.

In this case, the cutout portion 52 of the piston body 38 allows the passage of the engaging protrusion 56 of the piston rod 20, and the opening 50 receives a part of the engaging protrusion 56 extending in the circumferential direction. More specifically, the part of the engaging protrusion 56 extending in the circumferential direction passes through the cutout portion 52 of the piston body 38 and is inserted into the opening 50. In this manner, the cutout portion 52 and the opening 50 function as clearance preventing the engaging protrusion 56 of the piston rod 20 from interfering with the piston outer circumferential portion 38b.

Figure 4B:
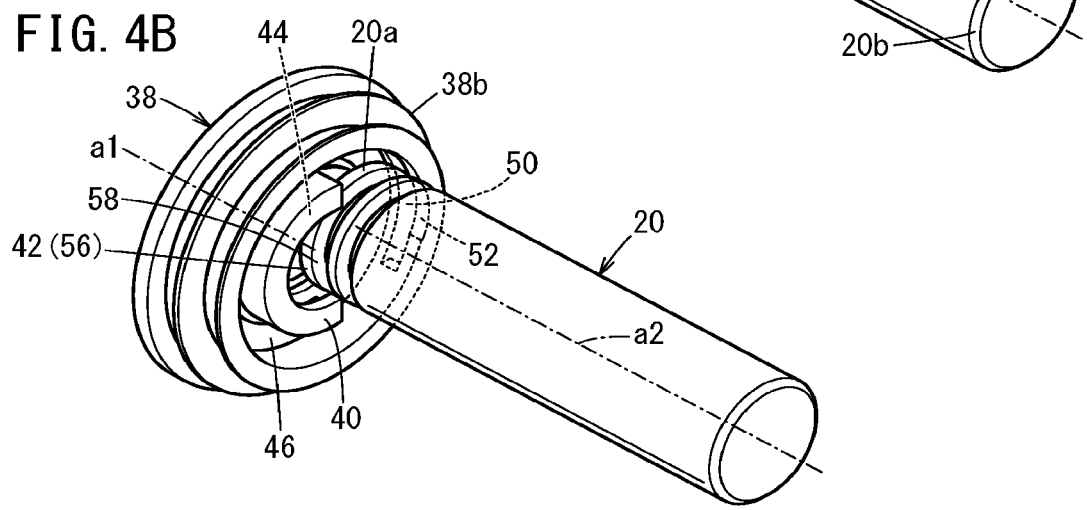
FIG. 4B is a second diagram illustrating the method of assembling the piston assembly.
Figure 4C:
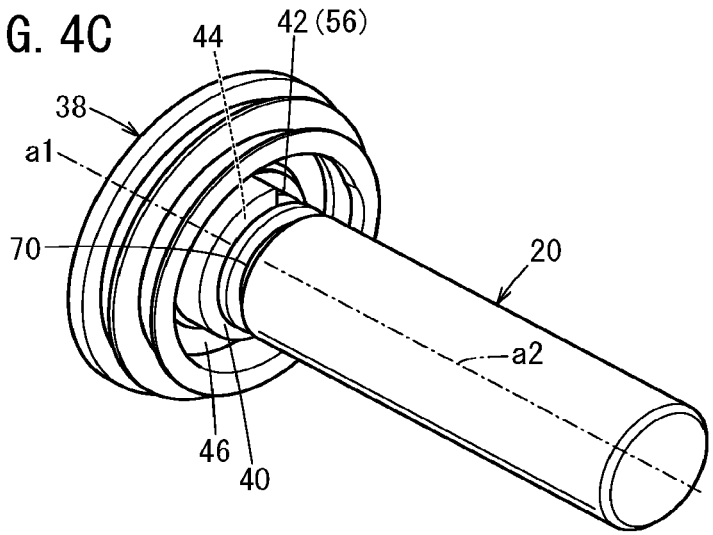
FIG. 4C is a third diagram illustrating the method of assembling the piston assembly.

In FIG. 4B, the axis a1 of the piston body 38 and an axis a2 of the piston rod 20 are shifted from each other, and the rod-side engaging portion 42 is located beside the piston-side engaging portion 40. Then, as illustrated in FIG. 4C, the piston body 38 and the piston rod 20 are moved relative to each other in a direction perpendicular to the axis a1 of the piston body 38 such that the axis a1 of the piston body 38 and the axis a2 of the piston rod 20 match to insert the engaging protrusion 56 into the engaging groove 44. This causes the piston-side engaging portion 40 and the rod-side engaging portion 42 to engage with each other and thus the piston body 38 and the piston rod 20 to be connected with each other.

Next, the packing 34 and the magnet 48 are attached to the piston body 38, and the stopper member 72 and the circumference-side damper 62 are attached to the piston rod 20. The packing 34 and the magnet 48 may be attached to the piston body 38 before the end-side damper 64 and the piston rod 20 are attached to the piston body 38.

To attach the stopper member 72 and the circumference-side damper 62 to the piston rod 20, first, the two stopper elements 72a are individually attached to (fitted into) the stopper receiving groove 70 of the piston rod 20 to form the annular stopper member 72. Next, the circumference-side damper 62 is moved from the distal end portion 20b side toward the proximal end portion 20a side of the piston rod 20 such that the circumference-side damper 62 covers the stopper member 72 (two stopper elements 72a). Thus, the stopper member 72 is prevented from coming off the stopper receiving groove 70, and the circumference-side damper 62 is held at a predetermined position in the outer circumferential part of the piston rod 20.

The piston assembly 17A illustrated in FIG. 1 is produced in this manner. In a state where the piston assembly 17A is assembled into the fluid pressure cylinder 10A as illustrated in FIG. 1, the piston unit 18 including the piston body 38 is supported by the cylinder tube 12, and the piston rod 20 is supported by the rod cover 16. Thus, the state where the axis a1 of the piston body 38 and the axis a2 of the piston rod 20 match is maintained. Consequently, the engagement between the piston-side engaging portion 40 and the rod-side engaging portion 42 is maintained.

Next, the effects and advantages of the fluid pressure cylinder 10A illustrated in FIG. 1 configured as above will be described. In the fluid pressure cylinder 10A, the piston unit 18 is moved inside the sliding hole 13 in the axial direction by the effect of pressurized fluid (for example, compressed air) introduced via the first port 12a or the second port 12b. The piston rod 20 connected with the piston unit 18 thereby moves back and forth.

Specifically, to displace (advance) the piston unit 18 toward the rod cover 16, the pressurized fluid is supplied from a pressurized fluid supply source (not illustrated) to the first pressure chamber 13a via the first port 12a while the second port 12b is open to the atmosphere. The pressurized fluid thereby pushes the piston unit 18 toward the rod cover 16. Thus, the piston unit 18 is displaced (advanced) toward the rod cover 16 together with the piston rod 20.

When the circumference-side damper 62 comes into contact with the end surface of the rod cover 16, the advancing motion of the piston unit 18 stops. In this case, the circumference-side damper 62 composed of elastic materials prevents the piston body 38 and the rod cover 16 from coming into direct contact with each other. Thus, impact and impact noise occurring when the piston body 38 reaches an advanced position (stroke end of the rod cover 16 side) are effectively prevented or reduced.

On the other hand, to displace (return) the piston unit 18 toward the head cover 14, pressurized fluid is supplied from the pressurized fluid supply source (not illustrated) to the second pressure chamber 13b via the second port 12b while the first port 12a is open to the atmosphere. The pressurized fluid thereby pushes the piston unit 18 toward the head cover 14. Thus, the piston unit 18 is displaced toward the head cover 14.

When an end surface 64c of the end-side damper 64 comes into contact with the head cover 14, the returning motion of the piston unit 18 stops. In this case, the end-side damper 64 composed of elastic materials prevents the piston body 38 and the head cover 14 from coming into direct contact with each other. Thus, impact and impact noise occurring when the piston unit 18 reaches the retracted position (stroke end of the head cover 14 side) are effectively prevented or reduced.

In this case, in the piston assembly 17A according to this embodiment, the piston body 38 includes the piston-side engaging portion 40, and the piston rod 20 includes the rod-side engaging portion 42 engaging with the piston-side engaging portion 40. In addition, one of the piston-side engaging portion 40 and the rod-side engaging portion 42 is inserted into the other from the side so that the piston-side engaging portion 40 and the rod-side engaging portion 42 engage with each other, thereby regulating the relative axial displacement of the piston body 38 and the piston rod 20.

Thus, the piston body 38 and the piston rod 20 can be easily connected by displacing the piston-side engaging portion 40 and the rod-side engaging portion 42 in the direction perpendicular to the axis a1 of the piston body 38 to engage with each other during the assembly process of connecting the piston body 38 and the piston rod 20. Moreover, the assembly can be easily performed by hand without using any specific tools, facilities, or devices. Consequently, the piston assembly 17A of the present invention can simplify the assembly work.

In this embodiment, one of the piston-side engaging portion 40 and the rod-side engaging portion 42 includes the U-shaped, C-shaped, or semicircular arc engaging groove 44, and the other of the piston-side engaging portion 40 and the rod-side engaging portion 42 includes the annular engaging protrusion 56 fitted in the engaging groove 44. This structure enables a simple engagement structure regulating the relative axial displacement between the piston body 38 and the piston rod 20 by inserting one of the engaging portions into the other engaging portion from the side. Moreover, this structure can achieve sufficiently large axial connection strength between the piston body 38 and the piston rod 20.

Figure 5:
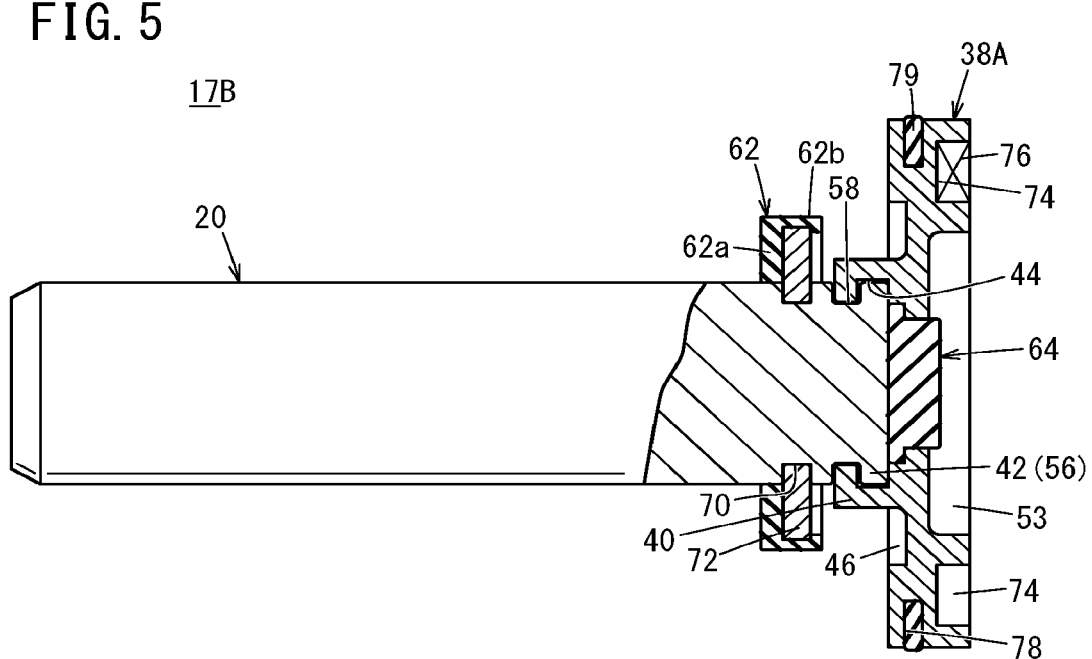
FIG. 5 is a cross-sectional view of a piston assembly according to a second embodiment.
Figure 6:
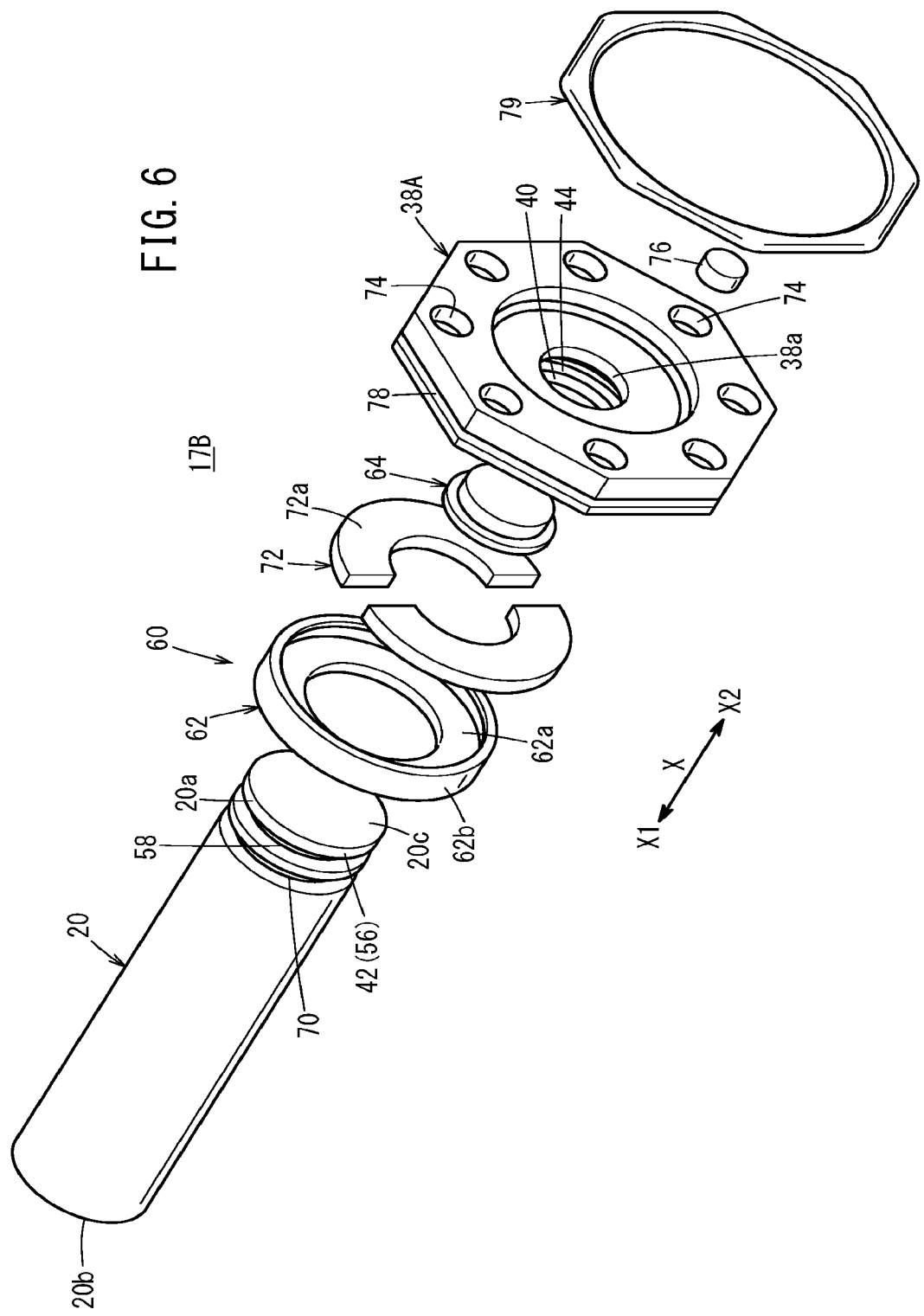
FIG. 6 is a perspective view of the piston assembly according to the second embodiment.

In this embodiment, the piston-side engaging portion 40 and the rod-side engaging portion 42 engage with each other to be rotatable relative to each other about the axis a1 of the piston body 38. This structure is convenient because the piston rod 20 is easily rotated during installation of the fluid pressure cylinder 10A to facilities. Moreover, the piston rod 20 is also rotatable in a piston assembly 17B (see FIGS. 5 and 6) provided with a polygonal piston body 38A (described below).

In this embodiment, the damper mechanism 60 reducing the impact occurring when the piston body reaches the stroke ends is provided. The damper mechanism 60 is supported by the piston body 38 so as not to transmit the impact load to the piston body 38 when the piston body reaches the stroke ends. Thus, the piston body 38 may be designed to have strength sufficient to endure the pressure from the working fluid and can be composed of resin. That is, the piston body 38 composed of resin can also achieve a practical durability easily. The piston body 38 composed of resin can reduce the weight of the piston assembly 17A.

In this embodiment, the damper mechanism 60 includes the circumference-side damper 62 disposed around the outer circumferential part of the piston rod 20, and the piston rod 20 is provided with the stopper receiving groove 70 extending in the circumferential direction in the outer circumferential part. The stopper member 72 divided into the plurality of elements in the circumferential direction is installed in the stopper receiving groove 70. In addition, the circumference-side damper 62 covers the stopper member 72. Thus, the circumference-side damper 62 is supported by the stopper member 72, and the stopper member 72 is prevented from coming off the stopper receiving groove 70. The circumference-side damper 62 with the above-described structure can successfully prevent the impact load from being transmitted to the piston body 38 when the piston body reaches one of the stroke ends.

In this embodiment, the damper mechanism 60 includes the end-side damper 64 disposed at the end surface 20c of the piston rod 20. The end-side damper 64 is held between the piston body 38 and the piston rod 20 and protrudes from the through-hole 38a disposed in the central part of the piston body 38. The end-side damper 64 with the above-described structure can successfully prevent the impact load from being transmitted to the piston body 38 when the piston body reaches the other stroke end.

In this embodiment, the end-side damper 64 seals the gap between the piston body 38 and the piston rod 20. Consequently, the end-side damper 64 also functions as the sealing member between the piston body 38 and the piston rod 20, leading to a reduction in the number of parts compared with a structure including a damper and a sealing member separately.

In this embodiment, the end-side damper 64 elastically pushes the end surface 20c of the piston rod 20. This structure can eliminate or reduce wobbling between the piston body 38 and the piston rod 20.

In this embodiment, the piston body 38 is provided with the thin portion 46 having a depth in the axial direction of the piston body 38 and surrounding the piston-side engaging portion 40. This leads to a reduction in the weight of the piston assembly 17A including the piston body 38. In addition, the reduction in the weight of the piston assembly 17A leads to a reduction in the consumption of the pressurized fluid and thus to energy savings.

The present invention is not limited to the circular piston body 38 described above, and is also applicable to the polygonal piston body 38. Thus, instead of the piston assembly 17A provided with the circular piston body 38, the fluid pressure cylinder may adopt the piston assembly 17B provided with the polygonal piston body 38A illustrated in FIGS. 5 and 6.

The piston body 38A of the piston assembly 17B has an octagonal shape. The piston body 38A is provided with a plurality of magnet receiving grooves 74 disposed at intervals in the circumferential direction. Specifically, the plurality of magnet receiving grooves 74 are formed in one of the surfaces of the piston body 38A and have a depth in the axial direction of the piston body 38A. A magnet 76 is installed in one of the magnet receiving grooves 74. The magnet 76 is, for example, a ferrite magnet, a rare earth magnet, or the like.

The piston body 38A is provided with an annular packing receiving groove 78 in the outer circumference. The bottom of the packing receiving groove 78 extends in a circle in the circumferential direction. A packing 79 composed of an elastic member is installed in the packing receiving groove 78. The outer circumference of the packing 79 has a polygonal shape identical to the shape of the piston body 38A (in the case of FIG. 6, an octagon). The inner circumference of the packing 79 has a circular shape.

The other part of the piston assembly 17B is configured similarly to the piston assembly 17A.

The piston assembly 17B yields effects similar to the effects of the piston assembly 17A. For example, the piston assembly 17B can also be easily assembled by hand without using any specific tools, facilities, or devices.

The above-described piston assembly 17A (FIG. 1) adopts the piston rod 20 having a solid structure. However, as in a case of piston assembly 17C illustrated in FIG. 7, a piston rod 20A having a hollow structure may be adopted. With this structure, the piston assembly 17C can achieve a further reduction in weight and energy consumption. Note that an opening of one end side of the piston rod 20A is sealed with the end-side damper 64 in an airtight or liquid-tight manner.

The above-described piston assembly 17A (FIG. 1) adopts the piston rod 20 protruding toward only one side of the piston body 38. However, as in piston assemblies 17D and 17E respectively illustrated in FIGS. 8A and 8B, piston rods 82 and 84 protruding toward both sides of a piston body 38B may be adopted.

Figure 8A:
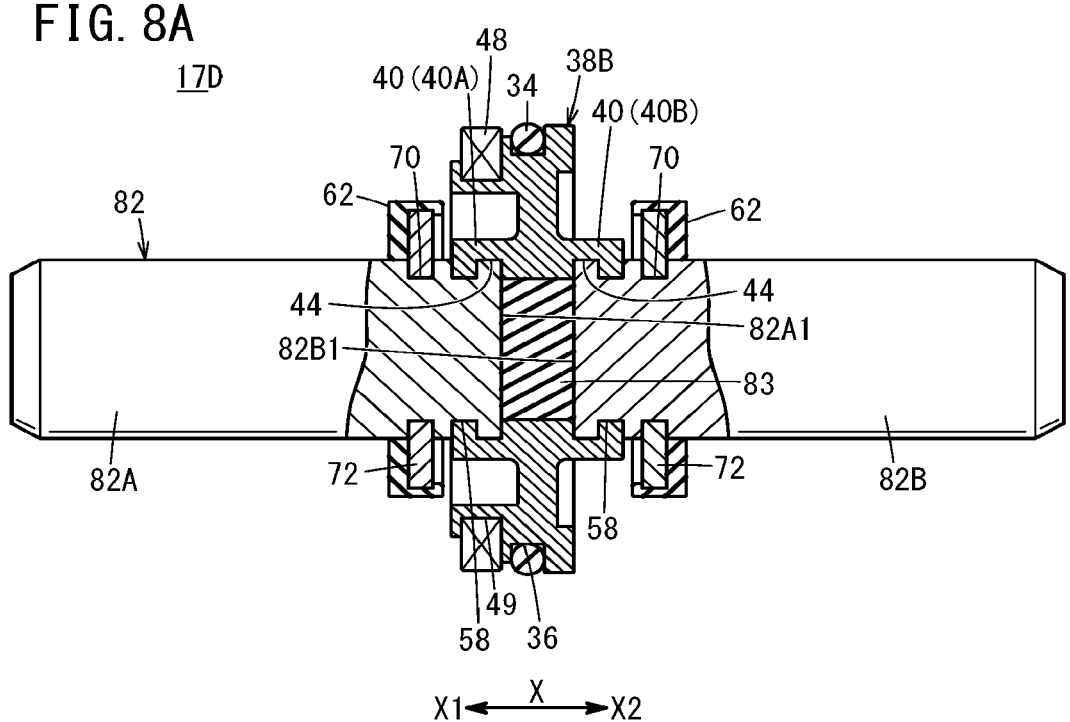
FIG. 8A is a cross-sectional view of a piston assembly according to a fourth embodiment.

The piston assembly 17D illustrated in FIG. 8A includes the piston body 38B provided with the packing receiving groove 36 and the magnet receiving groove 49 and the piston rod 82 connected with the piston body 38B. The piston body 38B includes the piston-side engaging portions 40 (hereinafter referred to as "first piston-side engaging portion 40A" and "second piston-side engaging portion 40B") on both sides in the axial direction.

The piston rod 82 includes a first rod 82A engaging with the first piston-side engaging portion 40A and a second rod 82B engaging with the second piston-side engaging portion 40B. The first rod 82A and the second rod 82B have a solid structure similar to the structure of the above-described piston rod 20. An intermediate member 83 is interposed between the first rod 82A and the second rod 82B.

The intermediate member 83 is preferably composed of elastic materials similar to the materials of the above-described circumference-side damper 62. Thus, the intermediate member 83 pushes an end surface 82A1 of the first rod 82A and an end surface 82B1 of the second rod 82B to eliminate or reduce wobbling between the piston body 38B and the first rod 82A and between the piston body 38B and the second rod 82B. The intermediate member 83 touches the piston body 38B, the first rod 82A, and the second rod 82B with no gap left, and thus also functions as an air seal between the first rod 82A side and the second rod 82B side.

As the piston rod 20 (FIG. 1), each of the first rod 82A and the second rod 82B is provided with the circumference-side damper 62 in an outer circumferential part, and the circumference-side dampers 62 are supported by the respective stopper members 72 attached to the first rod 82A and the second rod 82B.

Figure 8B:
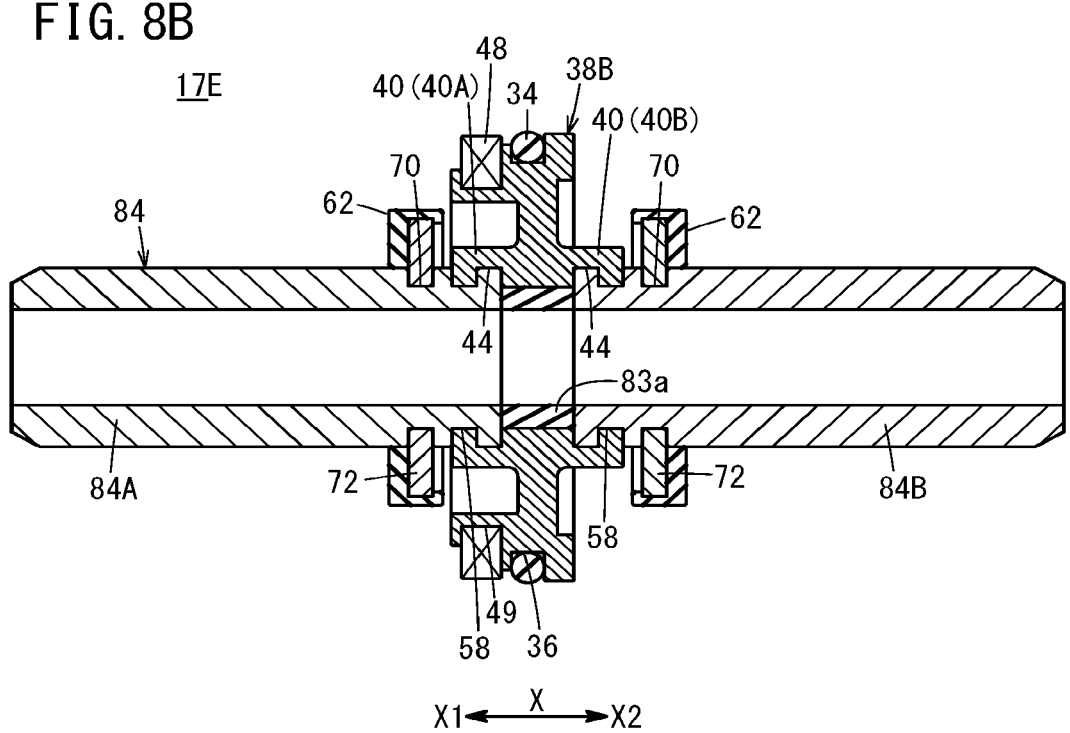
FIG. 8B is a cross-sectional view of a piston assembly according to a fifth embodiment.

In the piston assembly 17E illustrated in FIG. 8B, components corresponding to the first rod 82A, the second rod 82B, and the intermediate member 83 in the piston assembly 17D illustrated in FIG. 8A have hollow structures. More specifically, the piston assembly 17E includes the piston body 38B, the hollow piston rod 84 (first rod 84A and second rod 84b) connected with the piston body 38B, and a hollow intermediate member 83a interposed between the first rod 84A and the second rod 84b.

Figure 9A:
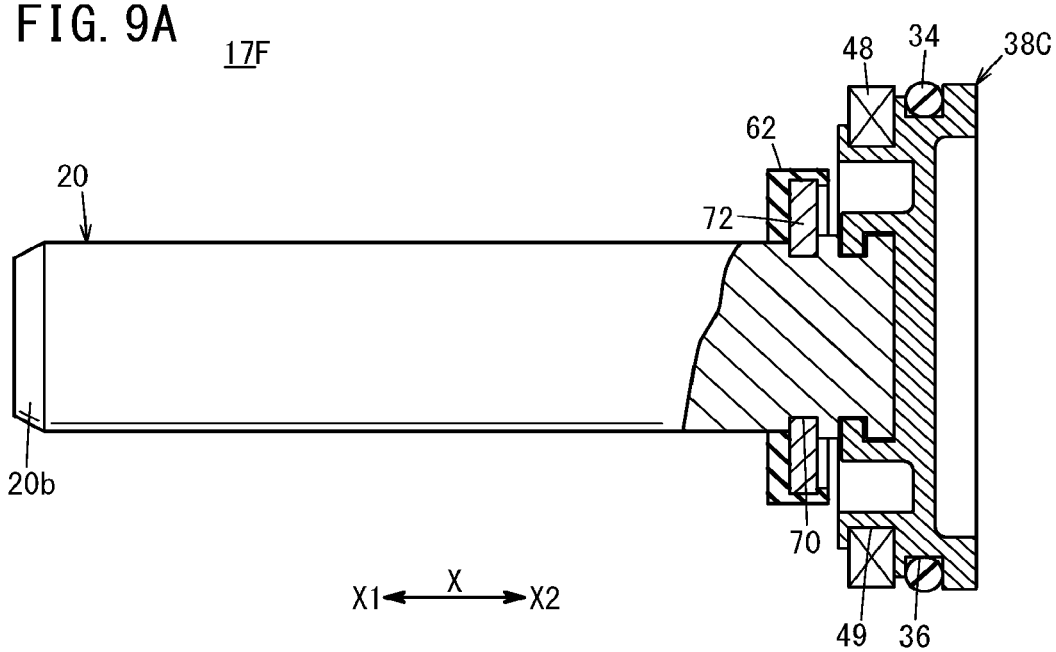
FIG. 9A is a cross-sectional view of a piston assembly according to a sixth embodiment.
Figure 9B:
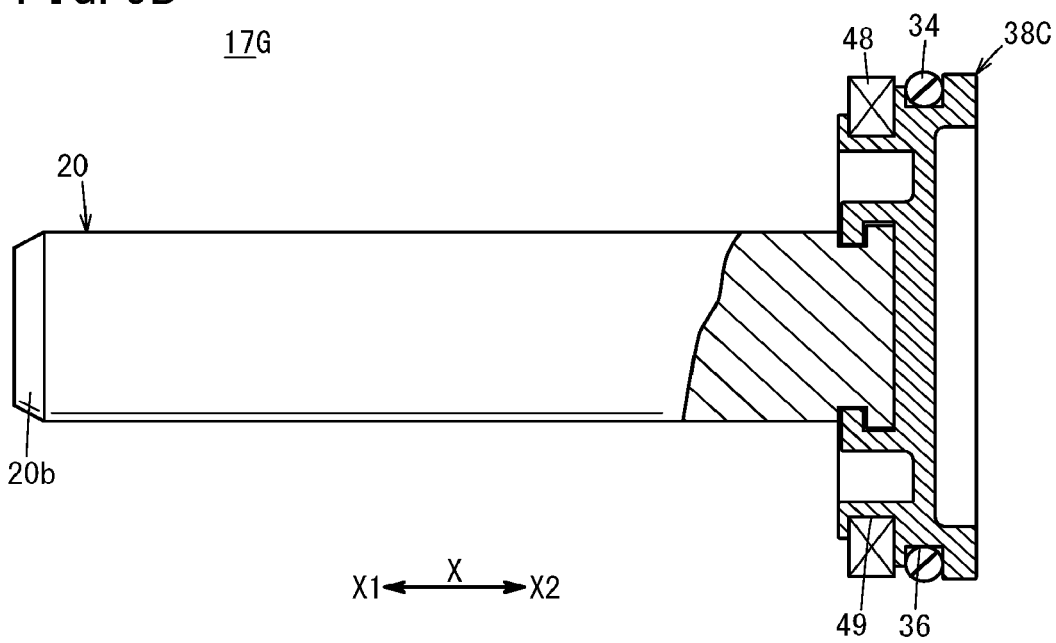
FIG. 9B is a cross-sectional view of a piston assembly according to a seventh embodiment.

The above-described piston assembly 17A (FIG. 1) is provided with both the circumference-side damper 62 and the end-side damper 64. However, as in a piston assembly 17F illustrated in FIG. 9A, only the circumference-side damper 62 may be provided as a damper mechanism. A piston body 38C of the piston assembly 17F has a structure similar to the structure of the piston body 38 of the piston assembly 17A except that the piston body 38C is not provided with a through-hole passing through in the axial direction. Alternatively, only the end-side damper 64 may be provided as the damper mechanism (the circumference-side damper 62 in the piston assembly 17A may be omitted). As in a piston assembly 17G illustrated in FIG. 9B, the damper mechanism may be omitted.

Figure 10A:
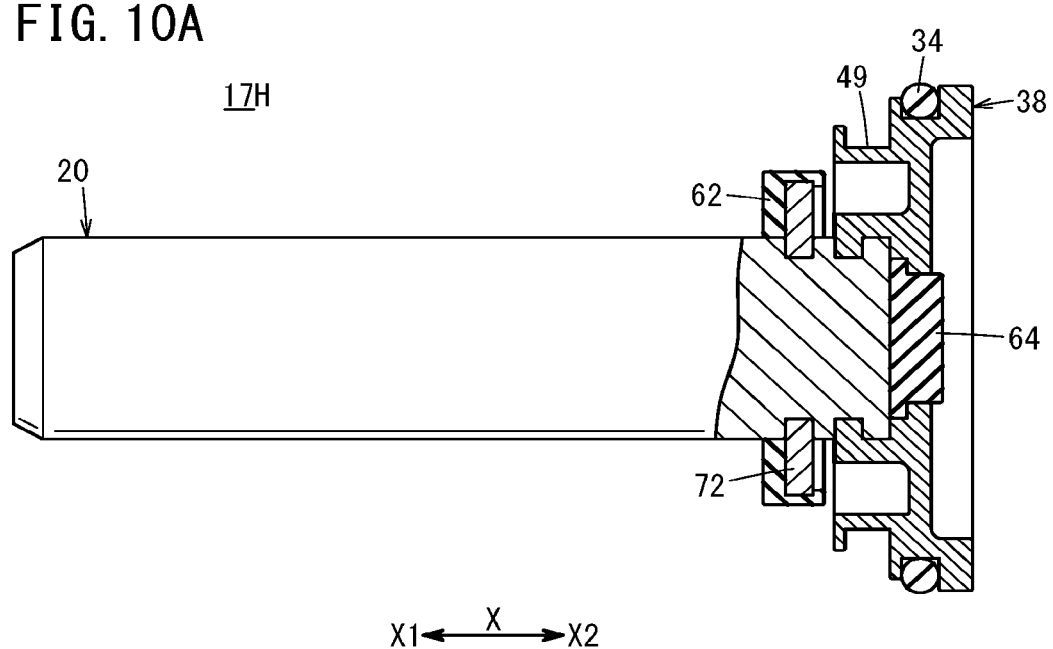
FIG. 10A is a cross-sectional view of a piston assembly according to an eighth embodiment.
Figure 10B:
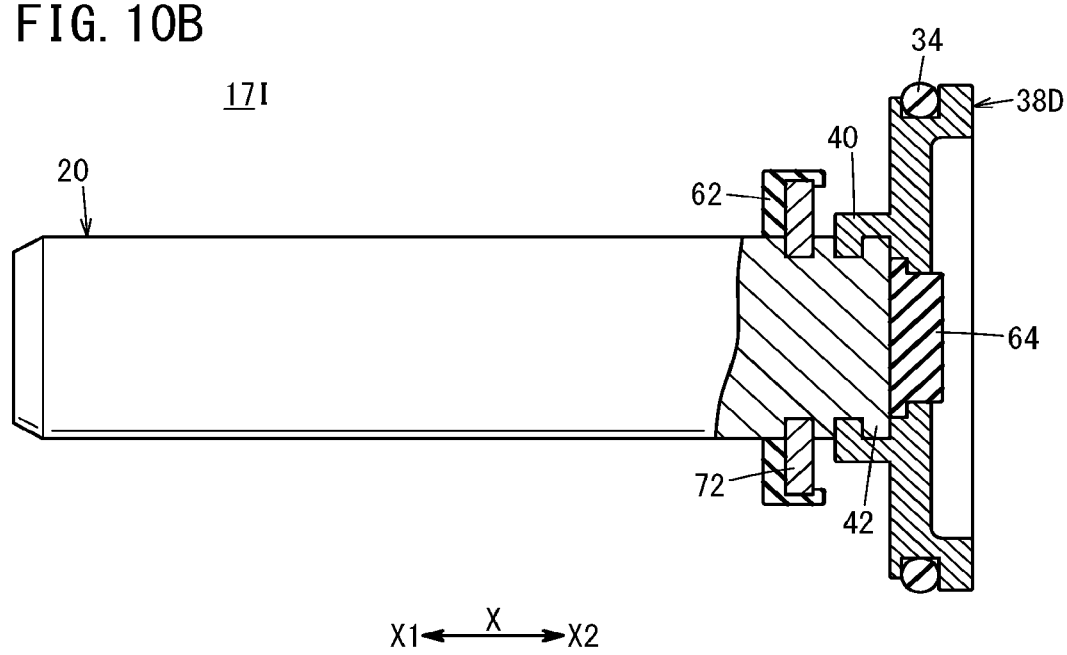
FIG. 10B is a cross-sectional view of a piston assembly according to a ninth embodiment.

In the above-described piston assembly 17A (FIG. 1), the magnet 48 may be omitted. In this case, as in a piston assembly 17H illustrated in FIG. 10A, the magnet receiving groove 49 may be left in the piston body 38. Alternatively, as in a piston assembly 17I illustrated in FIG. 10B, a piston body 38D from which the magnet receiving groove is omitted may be adopted.

Figure 11:
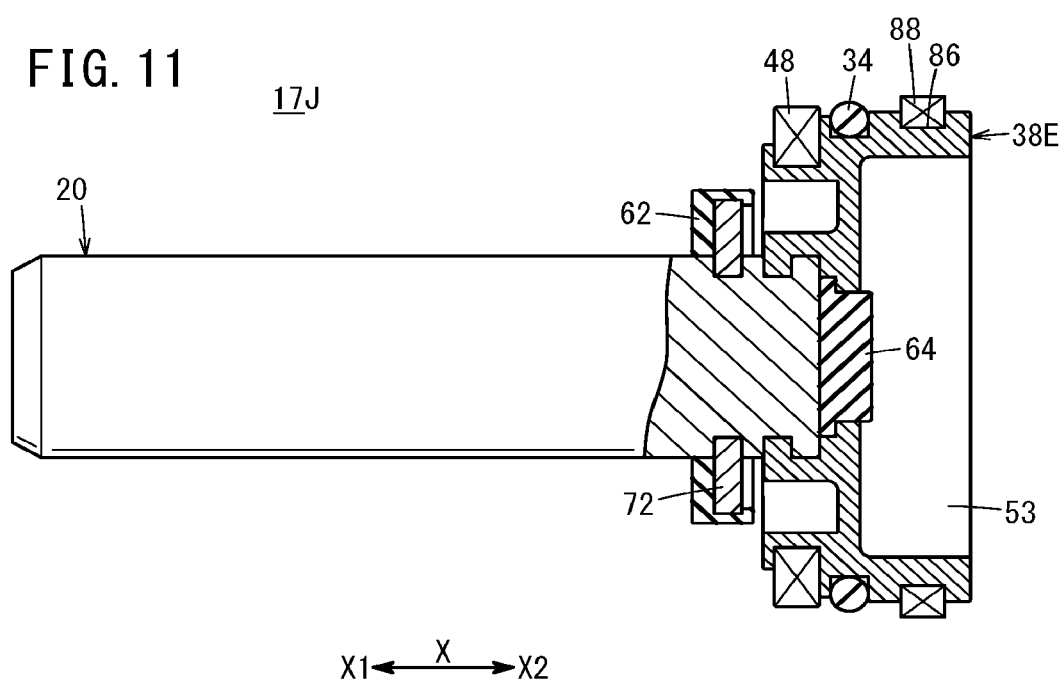
FIG. 11 is a cross-sectional view of a piston assembly according to a tenth embodiment.

In the above-described piston assembly 17A (FIG. 1), the piston outer circumferential portion 38b functions as a wear ring in a case where the piston body 38 is composed of low friction materials. Unlike this, as in a piston assembly 17J illustrated in FIG. 11, a piston body 38E provided with an annular wear ring receiving groove 86 may be adopted, and a wear ring 88 composed of low friction materials may be fitted in the wear ring receiving groove 86.

The wear ring 88 is an annular member for preventing the outer circumferential surface of the piston body 38E from coming into contact with the inner circumferential surface of the sliding hole 13 (FIG. 1). The outer diameter of the wear ring 88 is larger than the outer diameter of the piston body 38E. Such low friction materials include, for example, synthetic resins with a low coefficient of friction but a high resistance to wear such as polytetrafluoroethylene (PTFE) and metal materials (for example, bearing steel).

Figure 12:
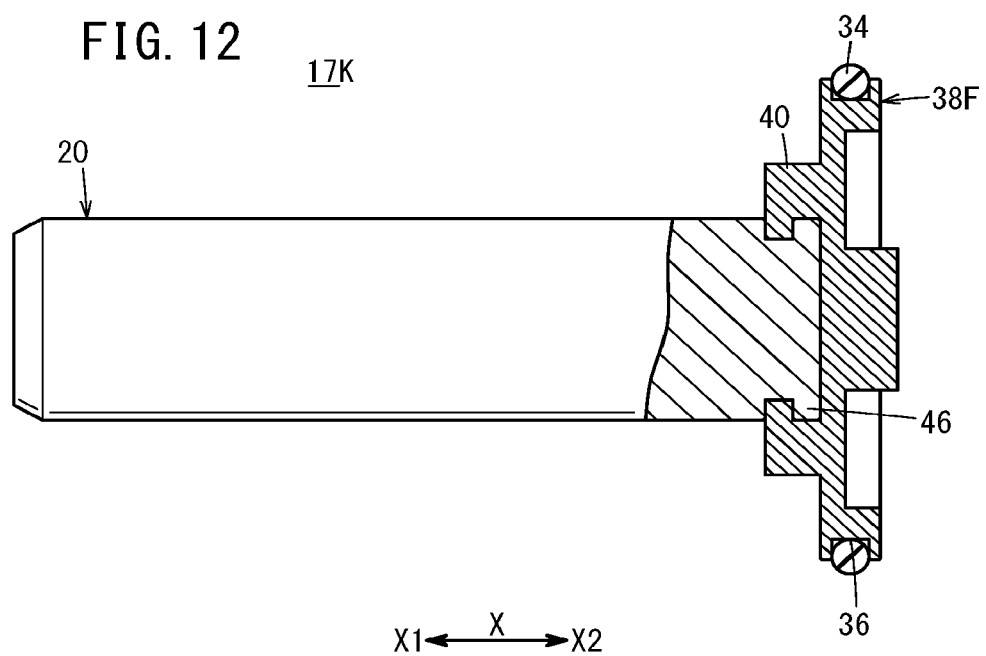
FIG. 12 is a cross-sectional view of a piston assembly according to an eleventh embodiment.

As in a piston assembly 17K illustrated in FIG. 12, a piston body 38F to which the magnet and the wear ring are not attached may be adopted, and the damper mechanism may be omitted.

Figure 13:
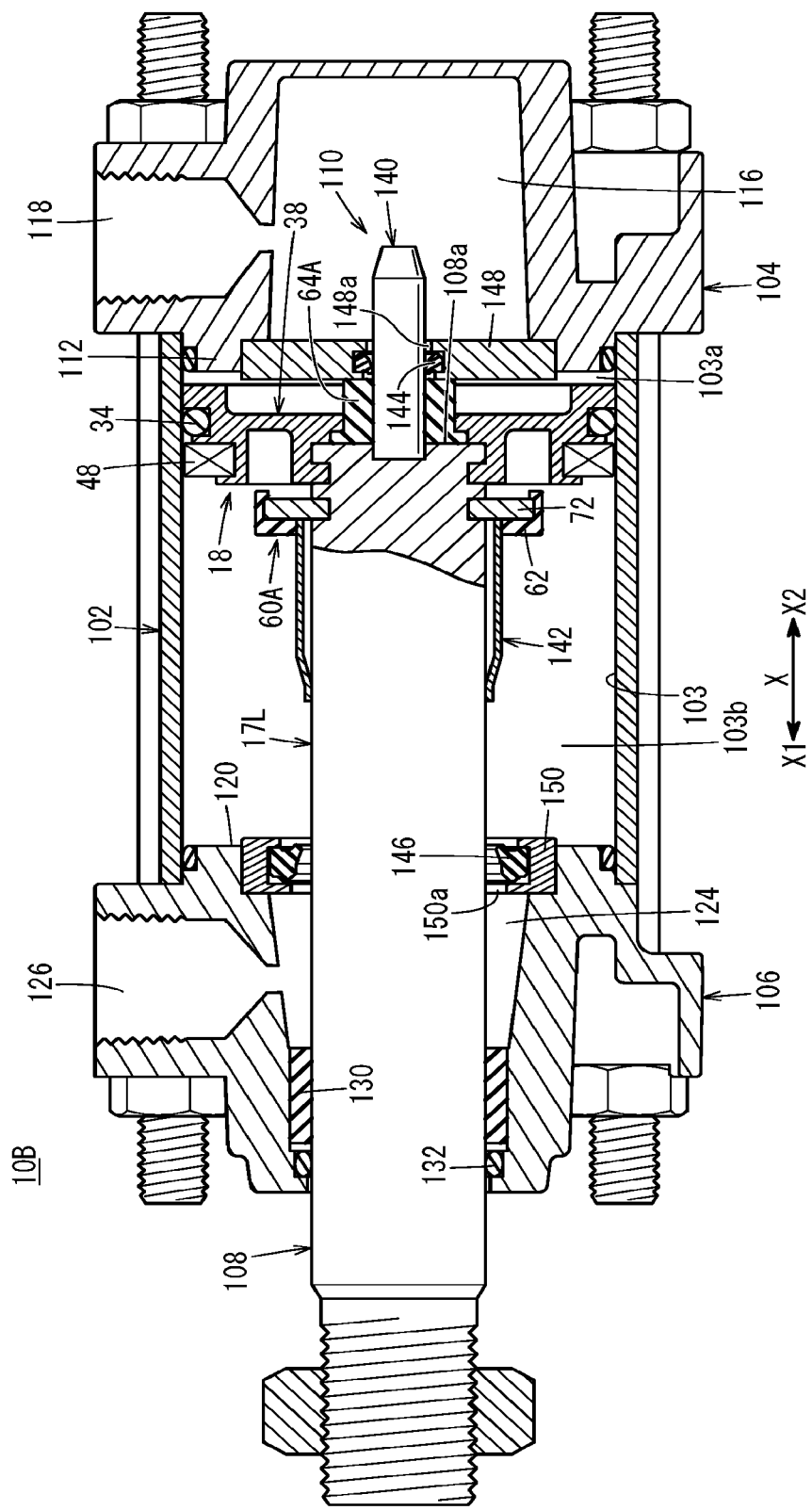
FIG. 13 is a cross-sectional view of a fluid pressure cylinder provided with a piston assembly according to a twelfth embodiment.

A fluid pressure cylinder 10B illustrated in FIG. 13 is provided with a cylinder tube 102 (body) having a hollow cylindrical shape, a head cover 104 disposed at one end portion of the cylinder tube 102, and a rod cover 106 disposed at another end portion of the cylinder tube 102. The fluid pressure cylinder 10B is further provided with a piston assembly 17L disposed to be able to reciprocate with respect to the cylinder tube 102, a damper mechanism 60A, and a cushioning mechanism 110 reducing impact at both stroke ends of the piston unit 18. The piston assembly 17L includes the piston unit 18 disposed inside the cylinder tube 102 to be movable in the axial direction (direction of the arrow X) and a piston rod 108 connected with the piston unit 18.

The cylinder tube 102 has a cylindrical shape, and a sliding hole 103 (cylinder chamber), accommodating the piston unit 18 and closed by the head cover 104 and the rod cover 106, is formed inside the cylinder tube 102.

A first stepped portion 112 of the head cover 104 is fitted in an end portion of the cylinder tube 102 located in the direction of the arrow X2. A first central hollow portion 116 and a first port 118 communicating with the first central hollow portion 116 are formed in the head cover 104. Pressurized fluid is supplied and discharged via the first port 118.

A second stepped portion 120 of the rod cover 106 is fitted in an end portion of the cylinder tube 102 located in the direction of the arrow X1. A second central hollow portion 124 and a second port 126 communicating with the second central hollow portion 124 are formed in the rod cover 106. Pressurized fluid is supplied and discharged via the second port 126. A ring-shaped bush 130 and a ring-shaped packing 132 are disposed on an inner circumferential part of the rod cover 106.

The piston unit 18 is configured in a manner similar to the piston unit 18 in the piston assembly 17A (FIG. 1).

The damper mechanism 60A includes the circumference-side damper 62 (having the same structure as the circumference-side damper 62 illustrated in FIG. 1) disposed around an outer circumferential part of the piston rod 108 and an end-side damper 64A disposed at an end surface 108a of the piston rod 108. The circumference-side damper 62 is located at an end of the piston body 38 side of a second cushioning member 142. The end-side damper 64A corresponds to the end-side damper 64 (FIG. 1) modified to be hollow and is held between the end surface 108a of the piston rod 108 and the inner circumference of the piston body 38.

The cushioning mechanism 110 includes a first cushioning member 140 and the second cushioning member 142 (cushion ring), which are provided on the movable part (piston rod 108) side, and a ring-shaped first cushion seal 144 and a ring-shaped second cushion seal 146, which are composed of elastic members and provided on the fixed part (the head cover 104 and the rod cover 106) side.

The first cushioning member 140 is disposed at an end of the piston rod 108 located in the direction of the arrow X2 to be coaxial with the piston rod 108. Specifically, the first cushioning member 140 has a smaller diameter than the piston rod 108 and protrudes from the end surface 108a of the piston rod 108 and the end surface of the end-side damper 64A in the direction of the arrow X2. The first cushioning member 140 has a hollow or solid cylindrical shape. The outer diameter of the first cushioning member 140 is smaller than the outer diameter of the end-side damper 64A.

The first cushioning member 140 may be a part integrated with the piston rod 108 or may be a separate component joined to the piston rod 108. In the case where the first cushioning member 140 is a component separate from the piston rod 108, the first cushioning member 140 may be joined to the piston rod 108 by joining means such as welding, bonding, and screwing.

The first cushion seal 144 is held by the inner circumference of a ring-shaped first holder 148. The first holder 148 is secured to the inner circumference of the first stepped portion 112 of the head cover 104. While the first cushioning member 140 is not fitted in a hole 148a of the first holder 148, the sliding hole 103 and the first central hollow portion 116 communicate with each other via the hole 148a. When the first cushioning member 140 is inserted into the hole 148a of the first holder 148, the first cushion seal 144 is brought into sliding contact with the outer circumferential surface of the first cushioning member 140 along the entire circumference.

The second cushioning member 142 is disposed adjacent to the rod cover 106 side of the piston unit 18 and in the vicinity of the piston unit 18 (side located in the direction of the arrow X1) to be coaxial with the piston rod 108. The second cushioning member 142 is a ring-shaped member having a larger diameter than the piston rod 108 and a smaller diameter than the piston unit 18, and is joined to the outer circumferential surface of the piston rod 108 by, for example, welding or bonding. In FIG. 13, the outer diameter of the second cushioning member 142 is slightly larger than the outer diameter of the piston rod 108.

The second cushion seal 146 is held by the inner circumference of a ring-shaped second holder 150. The second holder 150 is secured to the inner circumference of the second stepped portion 120 of the rod cover 106. While the second cushioning member 142 is not fitted in a hole 150a of the second holder 150, the sliding hole 103 and the second central hollow portion 124 communicate with each other via the hole 150a. When the second cushioning member 142 is inserted into the hole 150a of the second holder 150, the second cushion seal 146 is brought into sliding contact with the outer circumferential surface of the second cushioning member 142 along the entire circumference.

Next, the effects of the fluid pressure cylinder 10B configured as above will be described. In the description below, air (compressed air) is used as pressurized fluid. However, gas other than air may be used.

In the fluid pressure cylinder 10B, the piston unit 18 is moved inside the sliding hole 103 in the axial direction by the effect of pressurized fluid introduced via the first port 118 or the second port 126. The piston rod 108 connected with the piston unit 18 thereby moves back and forth.

Specifically, while the piston unit 18 is located at the retracted position illustrated in FIG. 13, the second port 126 is open to the atmosphere, and air is supplied from a pressurized fluid supply source (not illustrated) to a first pressure chamber 103a via the first port 118, the first central hollow portion 116, and the hole 148a. The piston unit 18 thereby is displaced (advanced) toward the rod cover 106 together with the piston rod 108. In this case, the air inside a second pressure chamber 103b is discharged from the second port 126 via the hole 150a of the second holder 150 and the second central hollow portion 124.

When the circumference-side damper 62 comes into contact with the second holder 150, the advancing motion of the piston unit 18 stops. The circumference-side damper 62 may have a size sufficiently large to come into contact with the rod cover 106 (and the second holder 150) when the piston unit 18 reaches the advanced position.

When the piston unit 18 approaches the advanced position, the second cushioning member 142 is inserted into the hole 150a of the second holder 150. The inner circumference of the second cushion seal 146 thereby comes into contact with the outer circumferential surface of the second cushioning member 142 and thus creates an airtight seal at the contact part.

As a result, an air cushion is formed in the second pressure chamber 103b. The air cushion in the second pressure chamber 103b serves as displacement resistance during the displacement of the piston unit 18 toward the rod cover 106 and decelerates the displacement of the piston unit 18 in the vicinity of the stroke end of the rod cover 106 side. Consequently, impact occurring when the piston unit 18 reaches the stroke end is further relieved. The air is discharged via a small hole (not illustrated) to the second port 126 by small amounts.

On the other hand, while the piston unit 18 is located at the advanced position (stroke end of the rod cover 106 side), the first port 118 is open to the atmosphere, and air is supplied from the pressurized fluid supply source (not illustrated) to the second pressure chamber 103b via the second port 126, the second central hollow portion 124, and the hole 150a. The piston unit 18 thereby is displaced (retracted) toward the head cover 104. In this case, the air inside the first pressure chamber 103a is discharged from the first port 118 via the hole 148a of the first holder 148 and the first central hollow portion 116. When the end-side damper 64A comes into contact with the first holder 148, the returning motion of the piston unit 18 stops.

When the piston unit 18 approaches the retracted position, the first cushioning member 140 is inserted into the hole 148a of the first holder 148. The inner circumference of the first cushion seal 144 thereby comes into contact with the outer circumferential surface of the first cushioning member 140 and thus creates an airtight seal at the contact part.

As a result, an air cushion is formed in the first pressure chamber 103a. The air cushion in the first pressure chamber 103a serves as displacement resistance during the displacement of the piston unit 18 toward the head cover 104 and decelerates the displacement of the piston unit 18 in the vicinity of the stroke end of the head cover 104 side. Consequently, impact occurring when the piston unit 18 reaches the stroke end is further relieved.

Figure 14A:
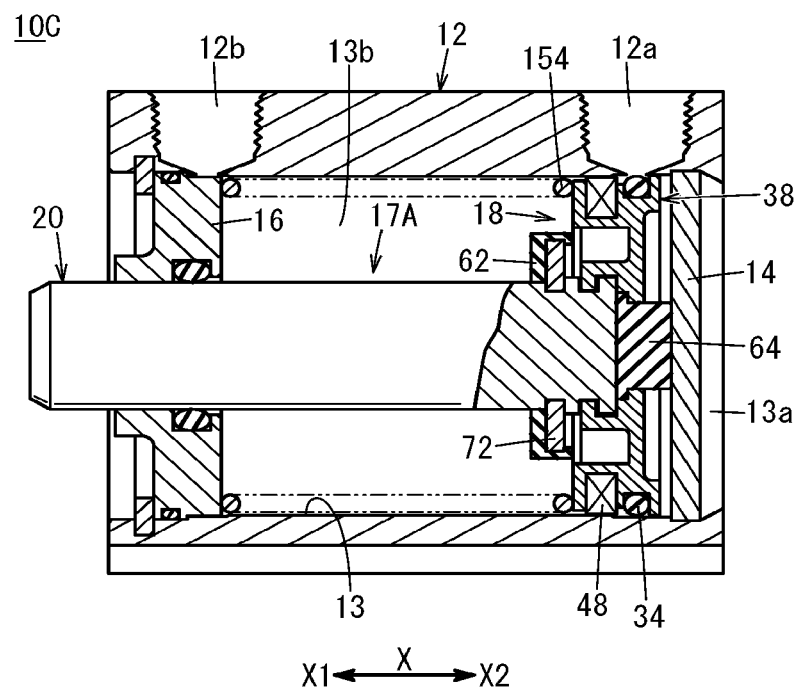
FIG. 14A is a cross-sectional view of a fluid pressure cylinder configured as a single-acting cylinder.

A fluid pressure cylinder 10C illustrated in FIG. 14A is configured as a so-called single-acting cylinder. Specifically, the fluid pressure cylinder 10C has a structure similar to the structure of the fluid pressure cylinder 10A (FIG. 1) except that a spring 154 is disposed between the piston unit 18 and the rod cover 16. In this case, the second port 12b is open to the atmosphere.

In the fluid pressure cylinder 10C, when pressurized fluid is supplied to the first pressure chamber 13a via the first port 12a, the piston unit 18 is displaced (advanced) toward the rod cover 16 by the pressurized fluid and reaches the stroke end at the advanced position. When the supply of the pressurized fluid to the first port 12a is stopped and the first port 12a is open to the atmosphere, the piston unit 18 is displaced (retracted) toward the head cover 14 by the elastic biasing force of the spring 154 and reaches the stroke end at the retracted position.

Figure 14B:
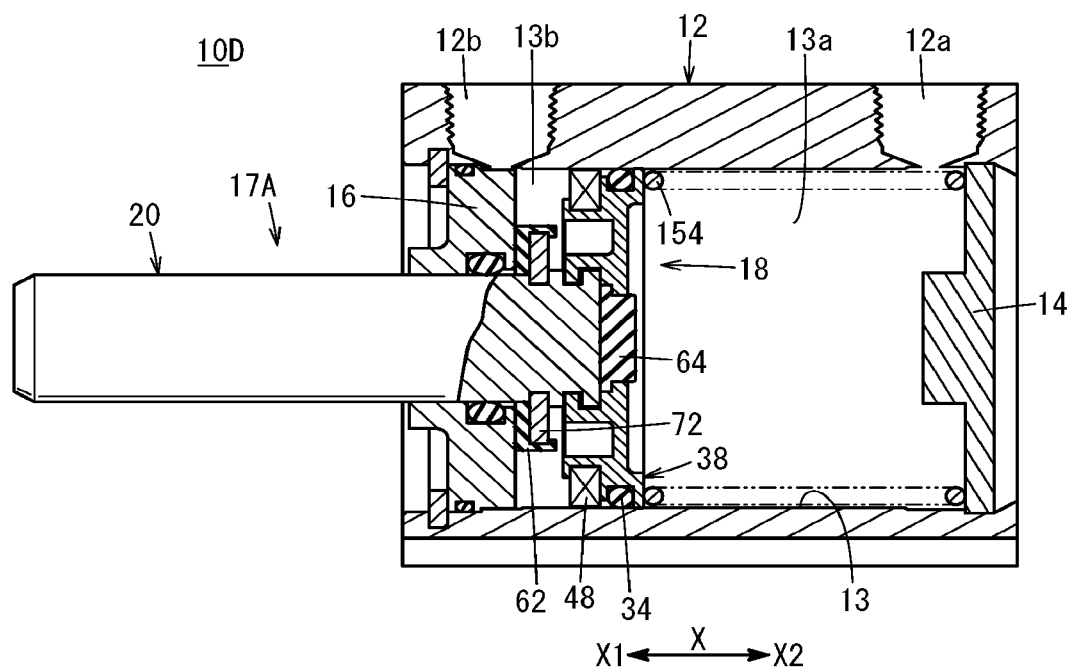
FIG. 14B is another fluid pressure cylinder configured as a single-acting cylinder.

A fluid pressure cylinder 10D illustrated in FIG. 14B is also configured as a so-called single-acting cylinder. Specifically, the fluid pressure cylinder 10D has a structure similar to the structure of the fluid pressure cylinder 10A (FIG. 1) except that the spring 154 is disposed between the piston unit 18 and the head cover 14. In this case, the first port 12a is open to the atmosphere.

In the fluid pressure cylinder 10D, when pressurized fluid is supplied to the second pressure chamber 13b via the second port 12b, the piston unit 18 is displaced (retracted) toward the head cover 14 by the pressurized fluid and reaches the stroke end at the retracted position. When the supply of the pressurized fluid to the second port 12b is stopped and the second port 12b is open to the atmosphere, the piston unit 18 is displaced (advanced) toward the rod cover 16 by the elastic biasing force of the spring 154 and reaches the stroke end at the advanced position.

Figure 15:
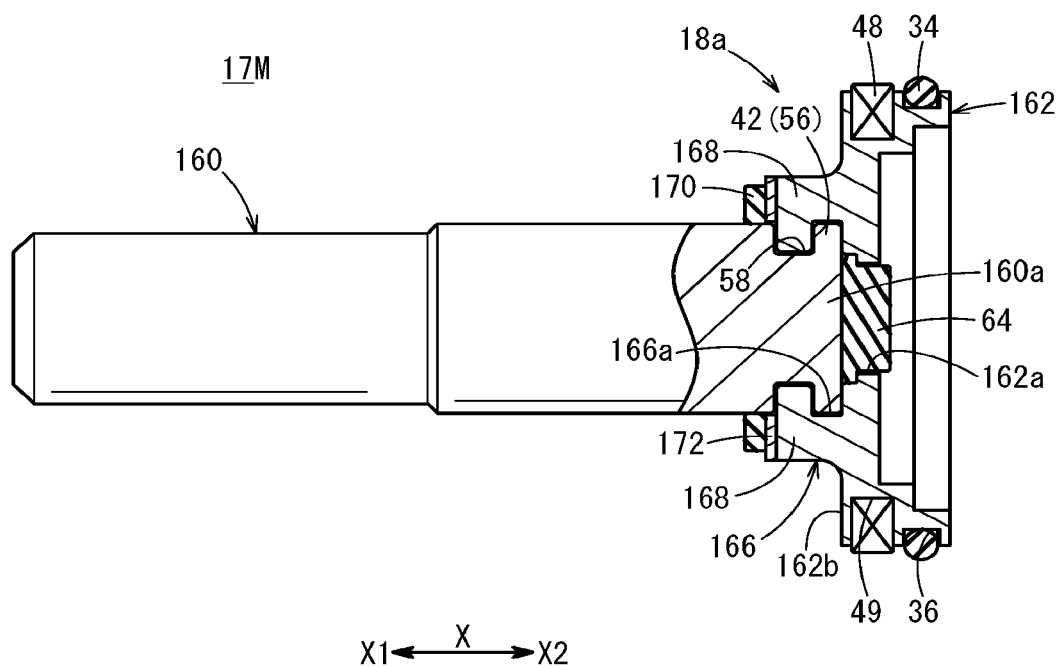
FIG. 15 is a cross-sectional view of a piston assembly according to a thirteenth embodiment.

A piston assembly 17M illustrated in FIGS. 15 and 16 may be adopted in the above-described fluid pressure cylinders 10A to 10D. The piston assembly 17M includes a piston unit 18a and a piston rod 160 connected with the piston unit 18a.

The piston unit 18a includes a piston body 162 connected with the piston rod 160, and the packing 34 and the magnet 48 attached to an outer circumferential part of the piston body 162. The constituent materials of the piston body 162 can be selected from materials given as an example of the constituent materials of the piston body 38 (FIG. 1 and the like) described above. The end-side damper 64 is disposed between the piston body 162 and the piston rod 160. The end-side damper 64 is fitted in a through-hole 162a formed in the piston body 162.

A piston-side engaging portion 166 is integrated with the piston body 162. The piston-side engaging portion 166 is open sideways. In FIG. 16, the piston-side engaging portion 166 protrudes from an end surface 162b of the piston body 162 in the axial direction (direction of the arrow X) and has a U shape when viewed in the axial direction. The piston-side engaging portion 166 is provided with a U-shaped engaging groove 166a in the inner circumferential surface.

The piston-side engaging portion 166 includes a curved part 167 extending in an arc along the shape of the circumference of the through-hole 162a and two arm parts 168 extending linearly and in parallel from both ends of the curved part 167. The distal ends of the two arm parts 168 are located radially further outward than the through-hole 162a when viewed in the axial direction of the piston body 162.

In this manner, the piston body 162 is provided with the U-shaped piston-side engaging portion 166. The piston-side engaging portion 166 thereby functions as a reinforcing rib and thus reinforces the piston body 162. As a result, the strength of the piston body 162 increases against static pressure occurring when the fluid pressure cylinder into which the piston assembly 17M is incorporated operates.

A proximal end portion 160a of the piston rod 160 is provided with the rod-side engaging portion 42 engaging with the U-shaped engaging groove 166a of the piston-side engaging portion 166. The annular engaging protrusion 56 constitutes the rod-side engaging portion 42. The annular groove 58 is adjacent to the engaging protrusion 56. The engaging protrusion 56 is inserted into the U-shaped piston-side engaging portion 166 from the side direction and regulates the relative axial displacement between the piston body 162 and the piston rod 160. The constituent materials of the piston rod 160 can be selected from materials given as an example of the constituent materials of the piston rod 20 (FIG. 1 and the like) described above.

A ring-shaped circumference-side damper 170 composed of elastic materials is disposed on an outer circumferential part of the piston rod 160 to relieve impact occurring when the piston body reaches the stroke end located in the direction of the arrow X1. A ring-shaped spacer 172 is interposed between the piston body 162 and the circumference-side damper 170. The spacer 172 is in contact with the piston-side engaging portion 166.

The piston body 162, the spacer 172, and the circumference-side damper 170 are stacked in the axial direction. The spacer 172 is composed of harder materials than the circumference-side damper 170 is. The constituent materials of the spacer 172 can be selected from materials given as an example of the constituent materials of the piston rod 20 (FIG. 1 and the like) described above.

In the structure of the piston assembly 17M, the load generated when the piston body reaches the stroke end located in the direction of the arrow X1 is transmitted to the piston body 162 via the circumference-side damper 170. Thus, the piston body 162 receives the load generated when the piston body reaches the stroke end. In a case where the piston body 162 is composed of metal materials, which have higher strength than resin materials, the strength of the piston body 162 can be sufficiently high.

The circumference-side damper 170 is not supported by the U-shaped piston-side engaging portion 166 but by the ring-shaped spacer 172 along the entire circumference since the ring-shaped spacer 172 harder than the circumference-side damper 170 is interposed between the piston body 162 and the circumference-side damper 170. Thus, the circumference-side damper 170 composed of the elastic materials is prevented from being damaged by the load generated when the piston body reaches the stroke end.

The present invention is not limited to the above-described embodiments, and various modifications can be made without departing from the spirit and scope of the present invention. For example, the present invention is applicable to fluid pressure cylinders provided with piston units and cylinder tubes with non-circular (quadrangular or elongated circular such as elliptical) cross-sections (for example, the piston assembly 17B in FIG. 5). Moreover, the present invention is also applicable to multi-rod (such as dual rod) fluid pressure cylinders provided with a plurality of pistons and piston rods.

Moreover, the present invention is not limited to the fluid pressure cylinders used as, for example, actuators and is also applicable to fluid pressure devices according to other embodiments including pistons. Fluid pressure devices having pistons according to the other embodiments, to which the present invention is applicable, include, for example, a valve device for switching channels by moving a valve body using a piston, a measuring cylinder for measuring length by displacing a piston connected with a piston rod serving as an input shaft, a sliding table connected with a piston via a piston rod and displaced by displacing the piston, and a chuck device for gripping a workpiece using a gripping part opened and closed by converting the displacement of a piston.

The invention claimed is:
1. A piston assembly, comprising:
a piston body displaceable in an axial direction inside a sliding hole; and
a piston rod protruding from the piston body in the axial direction, wherein:
the piston body includes a piston-side engaging portion;
the piston rod includes a rod-side engaging portion engaging with the piston-side engaging portion;
one of the piston-side engaging portion and the rod-side engaging portion is inserted into the other from a side to engage with each other to regulate relative axial displacement between the piston body and the piston rod;
the piston body includes a disk-shaped wall portion and the piston-side engaging portion which protrudes in the axial direction of the piston body from the disk-shaped wall portion;
the piston-side engaging portion includes an engaging groove which has a U shape, a C shape, or a semicircular arc shape and an inner protrusion which protrudes inward and is disposed adjacent to the engaging groove, the engaging groove being formed between the disk-shaped wall portion and the inner protrusion;
the rod-side engaging portion includes an engaging protrusion having an annular shape and an annular groove which is disposed adjacent to the engaging protrusion and extends in a circumferential direction of the piston rod;
the inner protrusion of the piston-side engaging portion is fitted in the annular groove of the rod-side engaging portion; and
the engaging protrusion of the rod-side engaging portion is fitted in the engaging groove of the piston-side engaging portion,
wherein:
a damper mechanism configured to relieve impact occurring when the piston body reaches at least one of stroke ends;
the damper mechanism is supported by the piston body so as not to transmit impact load to the piston body when the piston body reaches the stroke end;
the damper mechanism includes a circumference-side damper disposed around an outer circumferential part of the piston rod;
the piston rod is provided with a stopper receiving groove extending in a circumferential direction in the outer circumferential part;
a stopper member divided into a plurality of elements in the circumferential direction is fitted in the stopper receiving groove; and
the circumference-side damper covers the stopper member, and thus the stopper member supports the circumference-side damper and is prevented from coining off the stopper receiving groove.

2. The piston assembly according to claim 1, wherein the piston-side engaging portion and the rod-side engaging portion engage with each other to be rotatable relative to each other about an axis of the piston body.

3. The piston assembly according to claim 1, wherein:
the damper mechanism includes an end-side damper disposed at an end surface of the piston rod; and the end-side damper is held between the piston body and the piston rod and protrudes from a through-hole disposed in a central part of the piston body.

4. The piston assembly according to claim 3, wherein the end-side damper seals a gap between the piston body and the piston rod.

5. The piston assembly according to claim 3, wherein the end-side damper elastically pushes the end surface of the piston rod.

6. The piston assembly according to claim 1, wherein the piston body is composed of resin.

7. The piston assembly according to claim 1, wherein the piston body is provided with a thin portion having a depth in an axial direction of the piston body and surrounding the piston-side engaging portion.

8. The piston assembly according to claim 1, further comprising:
- a circumference-side damper having a ring shape and disposed around an outer circumferential part of the piston rod to relieve impact occurring when the piston body reaches a stroke end; and
- a spacer having a ring shape and interposed between the piston body and the circumference-side damper;
- wherein the piston body, the spacer, and the circumference-side damper are stacked in the axial direction.

9. A fluid pressure device, comprising:
- a body having a sliding hole inside the body; and
- a piston assembly disposed to be able to reciprocate along the sliding hole, wherein:
- the piston assembly includes a piston body displaceable in an axial direction inside the sliding hole and a piston rod protruding from the piston body in the axial direction;
- the piston body includes a piston-side engaging portion;
- the piston rod includes a rod-side engaging portion engaging with the piston-side engaging portion;
- one of the piston-side engaging portion and the rod-side engaging portion is inserted into the other from a side to engage with each other to regulate relative axial displacement between the piston body and the piston rod:
- the piston body includes a disk-shaped wall portion and the piston-side engaging portion which protrudes in the axial direction of the piston body from the disk-shaped wall portion;
- the piston-side engaging portion includes an engaging groove which has a U shape, a C shape, or a semicircular arc shape and an inner protrusion which protrudes inward and is disposed adjacent to the engaging groove, the engaging groove being formed between the disk-shaped wall portion and the inner protrusion;
- the rod-side engaging portion includes an engaging protrusion having an annular shape and an annular groove which is disposed adjacent to the engaging protrusion and extends in a circumferential direction of the piston rod;
- the inner protrusion of the piston-side engaging portion is fitted in the annular groove of the rod-side engaging portion; and
- the engaging protrusion of the rod-side engaging portion is fitted in the engaging groove of the piston-side engaging portion,
- wherein:
- a damper mechanism configured to relieve impact occurring when the piston body reaches at least one of stroke ends;
- the damper mechanism is supported by the piston body so as not to transmit impact load to the piston body when the piston body reaches the stroke end;
- the damper mechanism includes a circumference-side damper disposed around an outer circumferential part of the piston rod;
- the piston rod is provided with a stopper receiving groove extending in a circumferential direction in the outer circumferential part;
- a stopper member divided into a plurality of elements in the circumferential direction is fitted in the stopper receiving groove; and
- the circumference-side damper covers the stopper member, and thus the stopper member supports the circumference-side damper and is prevented from coming off the stopper receiving groove.

10. The fluid pressure device according to claim 9, wherein the fluid pressure device is configured as a fluid pressure cylinder, a valve device, a measuring cylinder, a sliding table, or a chuck device.

* * * * *